(12) United States Patent
Watanabe

(10) Patent No.: US 8,838,357 B2
(45) Date of Patent: Sep. 16, 2014

(54) BRAKING FORCE DISTRIBUTION CONTROL DEVICE FOR A VEHICLE

(75) Inventor: Yoshinori Watanabe, Gotenba (JP)

(73) Assignee: Toyota Jidosha Kabushiki Kaisha, Tokyo-shi (JP)

( * ) Notice: Subject to any disclaimer, the term of this patent is extended or adjusted under 35 U.S.C. 154(b) by 55 days.

(21) Appl. No.: 13/817,258

(22) PCT Filed: Jun. 3, 2011

(86) PCT No.: PCT/JP2011/062834
§ 371 (c)(1),
(2), (4) Date: Feb. 15, 2013

(87) PCT Pub. No.: WO2012/164749
PCT Pub. Date: Dec. 6, 2012

(65) Prior Publication Data
US 2013/0144500 A1     Jun. 6, 2013

(51) Int. Cl.
*B60T 8/176* (2006.01)
*B60T 8/26* (2006.01)
*B60T 8/1766* (2006.01)
*B60T 8/1764* (2006.01)
*B60T 8/1755* (2006.01)

(52) U.S. Cl.
CPC . *B60T 8/176* (2013.01); *B60T 8/26* (2013.01); *B60T 8/1755* (2013.01); *B60T 8/1766* (2013.01); *B60T 8/1764* (2013.01)
USPC ........... 701/73; 701/71; 701/90; 703/2; 703/8

(58) Field of Classification Search
CPC ..... B60T 8/1766; B60T 8/1764; B60T 8/176; B60T 8/1755; B60T 8/26
USPC .............. 701/70, 71, 73, 82, 90; 703/2, 6, 8
See application file for complete search history.

(56) References Cited

U.S. PATENT DOCUMENTS 5,577,812 A * 11/1996 Hirano et al. ................. 303/112
5,893,896 A *  4/1999 Imamura et al. ................ 701/70

(Continued)

FOREIGN PATENT DOCUMENTS

JP    2008 37259    2/2008
JP    2008 87496    4/2008

OTHER PUBLICATIONS

Goodarzi et al, Optimized Braking Force Distribution During a Braking-In-Turn Maneuver for Articulated Vehicles, IEEE, 2010 2nd International Conference on Mechanical and Electrical Technology (ICMET), 2010, pp. 555-559.*

(Continued)

*Primary Examiner* — Russell Frejd
(74) *Attorney, Agent, or Firm* — Oblon, Spivak, McClelland, Maier & Neustadt, L.L.P.

(57) ABSTRACT

Disclosed is a braking force distribution control device for a vehicle which has a braking apparatus capable of individually controlling braking forces of the wheels as required. Front or rear wheels having higher braking force sharing rate being referred to control reference wheels and the front or rear wheels having lower braking force sharing rate are referred to control object wheels. A difference value between braking slip index values of the left and right wheels of said control object wheels is referred to a reference difference value. A braking force distribution control is executed on the control object wheels so that the magnitude relationship in wheel speeds of the left and right wheels of the control object wheels is converse to that of the left and right wheels of the control reference wheels.

13 Claims, 10 Drawing Sheets

(56) References Cited

U.S. PATENT DOCUMENTS

| | | | |
|---|---|---|---|
| 6,470,254 B1* | 10/2002 | Schmitt et al. | 701/70 |
| 7,059,687 B2* | 6/2006 | Yasui et al. | 303/113.5 |
| 7,398,145 B2* | 7/2008 | Kato et al. | 701/80 |
| 7,853,388 B2* | 12/2010 | Wang | 701/81 |
| 8,660,769 B2* | 2/2014 | Onoda et al. | 701/73 |
| 2011/0015906 A1* | 1/2011 | Bian et al. | 703/2 |
| 2013/0245910 A1* | 9/2013 | Watanabe | 701/79 |

OTHER PUBLICATIONS

Suzuki et al, Driving/Braking Force Distribution of Four Wheel Vehicles by Quadratic Programming with Constraints, 2010 49th IEEE Conference on Decision and Control (CDC), 2010, pp. 4882-4889.*

International Search Report Issued Aug. 30, 2011 in PCT/JP11/62834 Filed Jun. 3, 2011.

* cited by examiner

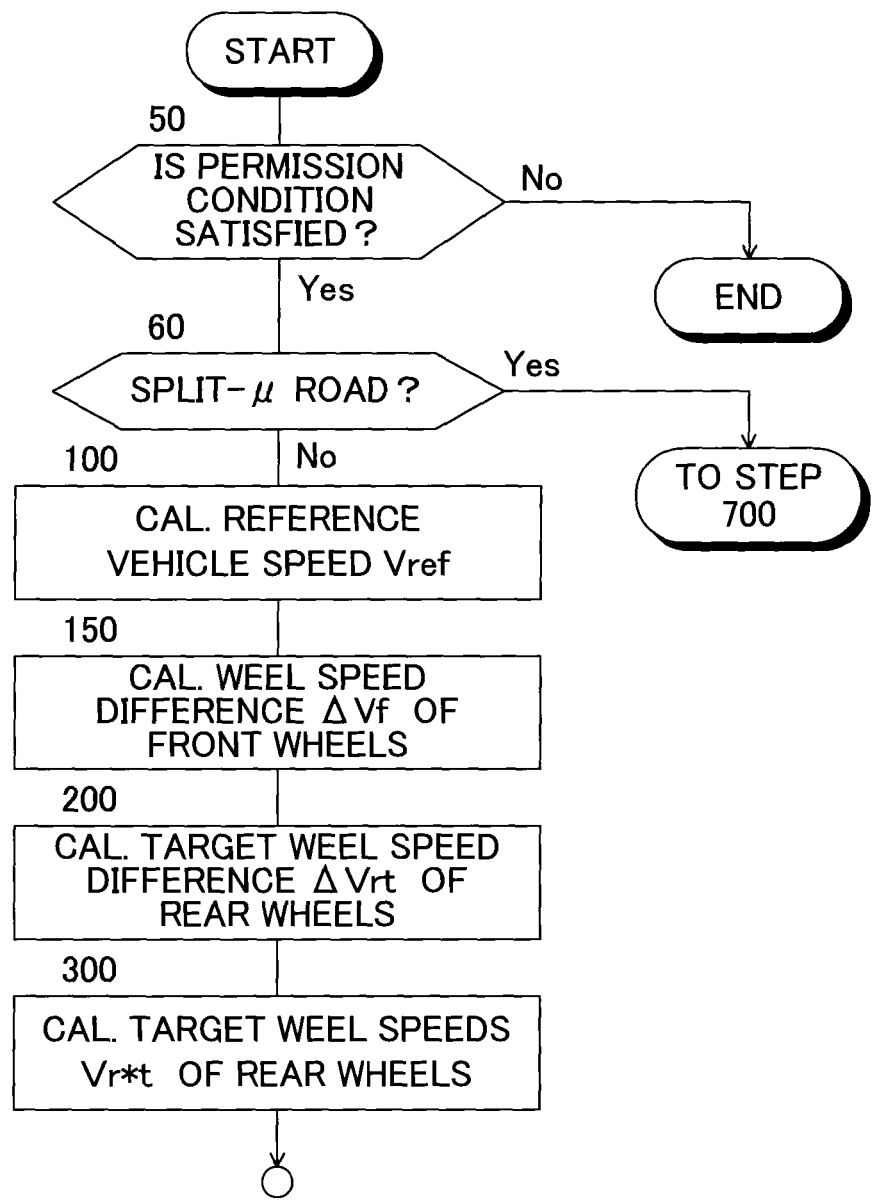

BRAKING FORCE DISTRIBUTION CONTROL DEVICE FOR A VEHICLE

TECHNICAL FIELD

The present invention relates to braking force control in a vehicle which has a braking apparatus capable of individually controlling braking forces of the wheels as required and, more particularly, to a braking force distribution control device for a vehicle.

BACKGROUND ART

In a vehicle such as an automobile and the like, a braking apparatus is provided which is capable of individually controlling braking forces of the wheels as required. Braking forces of the wheels are controlled at least in accordance with a braking demand and a braking force distribution is controlled by individually controlling the braking forces of the wheels as required. For example, as is described in the undermentioned patent citation 1, it has already been known to reduce a yaw moment acting on the vehicle by controlling braking forces of the left and right wheels when a difference in braking slip between the left and right wheels is large. According to this kind of braking force distribution control, in the situation where a yaw moment caused by the braking force difference between the left and right wheels acts on the vehicle, the yaw moment can be reduced, which enables to reduce turning deviation of the vehicle during braking as compared to the case where no braking force distribution control is executed.

CITATION LIST

Patent Literature 1: Japanese Patent Application Laid-open Publication No. 2008-87496

SUMMARY OF INVENTION

Technical Problem

However, in order to reduce a yaw moment in the situation where a difference in braking slip between the left and right wheels is large, braking force of a wheel is to be increased on the side of higher braking slip and/or braking force of a wheel is to be decreased on the side of lower braking slip. Accordingly, braking force is to be increased on the side of lower allowance for increasing braking force and/or braking force is to be decreased on the side of higher allowance for increasing braking force. As a result, vehicle stability is liable to rapidly vary due to increase and decrease braking forces and it is hard to stably reduce a yaw moment. In addition, as braking force shearing rate of the front wheels is generally higher than that of the rear wheels, the above-mentioned problems are noticeable in particular when a yaw moment is reduced by increasing and decreasing braking forces of the front and rear wheels in the situation where a difference in braking slip between the left and right wheels is large.

A primary object of the present invention is to reduce a yaw moment acting on a vehicle without causing vehicle stability to rapidly vary in the situation where a difference in braking slip degree between the left and right wheels is large.

Solution to Problem and Advantageous Effects

The present invention provides a braking force distribution control device for a vehicle having a braking apparatus capable of individually controlling braking forces of wheels, wherein with front or rear wheels having higher braking force sharing rate being referred to control reference wheels and the front or rear wheels having lower braking force sharing rate being referred to control object wheels; and a difference value between braking slip index values of the left and right wheels of the control reference wheels being referred to a reference difference value, a braking force distribution control is executed on the control object wheels so that the magnitude relationship in braking slip index values of the left and right wheels of the control object wheels is converse to that of the left and right wheels of the control reference wheels.

According to the configuration, a braking force distribution control is executed on the control object wheels so that the magnitude relationship in braking slip index values of the left and right wheels of the control object wheels is converse to that of the left and right wheels of the control reference wheels. Therefore, if the braking slip index values are considered in total for the front and rear wheels, a difference amount of the braking slip index values between left and right wheels can be reduced, which enables to suppress turning deviation of the vehicle due to the difference of the braking forces between the left and right wheels. In addition, since braking force distribution of the left and right wheels is controlled for the front or rear wheels which have lower braking force sharing rate, the possibility that the vehicle behavior rapidly vary can be reduced as compared to the case where braking force distribution of the left and right wheels is controlled for the front or rear wheels which have higher braking force sharing rate.

The above-mentioned configuration may be such that: a target difference value between braking slip index values of the left and right wheels of the control object wheels is calculated on the basis of the reference difference value, and the braking force distribution control is executed on the control object wheels so that a difference value between braking slip index values of the left and right wheels of the control object wheels is made closer to the target difference value.

According to the configuration, a target difference value between braking slip index values of the left and right wheels of the control object wheels is calculated on the basis of the reference difference value, and the braking force distribution control is executed on the control object wheels so that a difference value between braking slip index values of the left and right wheels of the control object wheels is made closer to the target difference value. Accordingly, the magnitude relationship of braking slip index values of the left and right wheels of the control object wheels can be made converse to that of the control reference wheels, and the difference value between braking slip index values of the left and right wheels of the control object wheels can be made closer to the target difference value.

The above-mentioned configuration may be such that: a ratio of the target difference value relative to the reference difference value in magnitude is preset to a constant value on the basis of a standard value of longitudinal wheel load ratio of the control object wheels relative to the control reference wheels which is determined by a specification of the vehicle and a standard value of longitudinal wheel load shift preset for the situation where the vehicle is under braking.

According to the configuration, since a ratio of the target difference value relative to the reference difference value in magnitude is preset to a constant value, the braking force distribution control of the control object wheels can easily be executed. In addition, the constant value is set on the basis of a standard value of longitudinal wheel load ratio of the control object wheels relative to the control reference wheels which is determined by a specification of the vehicle and a standard value of longitudinal wheel load shift preset for the situation where the vehicle is under braking. Accordingly, a ratio of the target difference value relative to the reference difference value in magnitude can be controlled in accordance with a ratio which is closer to an actual longitudinal wheel load ratio during braking as compared to the case where a standard value of longitudinal wheel load ratio preset for the vehicle under braking is not accounted for.

The above-mentioned configuration may be such that: a longitudinal wheel load ratio of the control object wheels relative to the control reference wheels is estimated, and a ratio of the target difference value relative to the reference difference value in magnitude is variably set on the basis of the estimated longitudinal wheel load ratio.

According to the configuration, a ratio of the target difference value relative to the reference difference value in magnitude can be varied on the basis of the estimated longitudinal wheel load ratio. Therefore, a ratio of the target difference value relative to the reference difference value in magnitude can be increasingly and decreasingly controlled in accordance with the change in longitudinal wheel load ratio, and, accordingly, a braking force distribution control can be appropriately executed on the control object wheels in accordance with an actual longitudinal wheel load ratio which varies when the vehicle runs.

The above-mentioned configuration may be such that: a lateral wheel load ratio of one of the control object wheels relative to the other of the control object wheels is estimated, and the distribution control amounts of the braking forces of the control object wheels are corrected on the basis of the estimated lateral wheel load ratio.

According to the configuration, the distribution control amounts of the braking forces of the control object wheels can be corrected on the basis of a lateral wheel load ratio of one of the control object wheels relative to the other of the control object wheels. Accordingly, a braking force distribution control can be more appropriately executed on the control object wheels in accordance with an actual lateral wheel load ratio which varies when the vehicle runs as compared to the case where a lateral wheel load ratio is set constant.

The above-mentioned configuration may be such that: when a detected direction of yaw movement of the vehicle and a direction of yaw movement of the vehicle estimated on the basis of a difference value between braking slip index values of the left and right front wheels of the control reference wheels are not the same, the braking force distribution control is prohibited from being executed on the control object wheels.

In general, when a vehicle turns, the wheel load of a turning outer wheel is increased and while on the other hand, the wheel load of a turning inner wheel is decreased, resulting in that the braking slip index of a turning inner wheel becomes higher than that of a turning outer wheel. Therefore, when a direction of yaw movement of the vehicle detected and a direction of yaw movement of the vehicle estimated on the basis of a difference value between braking slip index values of the left and right front wheels of the control reference wheels is not the same, its contributory factor may be considered to be a fact that a road friction coefficient corresponding to a turning inner wheel is higher than that corresponding to a turning outer wheel.

In this situation, since a braking slip index of the turning inner wheel of the control reference wheels becomes lower than that of the turning outer wheel, the braking forces of the control object wheels are controlled so that a braking slip index of the turning inner wheel becomes higher than that of the turning outer wheel. As a result, the braking forces are controlled so that the braking force of the turning inner wheel becomes higher than that of the turning outer wheel, which aggravates a yaw moment acting on the vehicle.

By contrast, according to the above-mentioned configuration, when directions of yaw movement of the vehicle compared are not the same, the braking force distribution control is prohibited from being executed on the control object wheels, which enables to prevent a yaw moment from being encouraged by the execution of the braking force distribution control and enables to prevent the vehicle turning behavior from being aggravated.

In addition, even when a vehicle actually makes a yaw movement, it may happen that braking slip index values of the left and right wheels become the same due to the difference in road friction coefficients corresponding to the left and right wheels, and the vehicle is estimated to be under straight running condition. Conversely, even when a vehicle actually runs straight ahead, it may happen that braking slip index values of the left and right wheels become different from each other due to the difference in road friction coefficients corresponding to the left and right wheels, and the vehicle is estimated to be under turning condition.

According to the above-mentioned configuration, when directions of yaw movement of the vehicle compared are not the same, the braking force distribution control is prohibited from being executed on the control object wheels, which enables to prevent the vehicle turning behavior from being aggravated by the execution of the braking force distribution control in the above-mentioned situations.

The above-mentioned configuration may be such that: when change rate in the wheel braking slip index of at least one of the control reference wheels exceeds in magnitude a change rate reference value, braking force distribution control amounts of the control object wheels are reduced in magnitude.

In general, when a wheel passes over a stepped road surface or the like, the wheel speed rapidly changes transiently, which may cause an instantaneous change in change rate of the braking slip index of the wheel in magnitude. In such a situation, a target difference value between braking slip index values of the left and right wheels of the control object wheels is calculated on the basis of a difference value between braking slip index values of the left and right wheels of the control reference wheels which instantaneously undergoes a significant change, which may unnecessarily cause to execute the braking force distribution control on the control object wheels.

According to the above-mentioned configuration, when change rate in the wheel braking slip index of at least one of the control reference wheels exceeds in magnitude a change rate reference value, braking force distribution control amounts of the control object wheels are reduced in magnitude. Therefore, it is possible to reduce the possibility that the braking force distribution control is unnecessarily executed on the control object wheels in such a situation where a wheel passes over a stepped road surface or the like and the wheel speed rapidly changes transiently.

The above-mentioned configuration may be such that: when the target difference value is large in magnitude, the ratio of the distribution control amount on the braking force decreasing side relative to that on the braking force increasing side is increased as compared to the case where the target difference value is small in magnitude.

In the situation where the above-described braking force distribution control is executed on the control object wheels, when the target difference value is large in magnitude, the increasing and decreasing control value of the braking forces of the control object wheels become large as compared to the case where the target difference value is small in magnitude, which increases the braking force of the wheel on the braking force increasing side to assume a value closer to a maximum braking force that the wheel can generate. For this reason, when the target difference value is large in magnitude, as compared to the case where the target difference value is small in magnitude, the control of the braking force of the wheel on the braking force increasing side is liable to be unstable and an anti-skid control is liable to start earlier for that wheel.

According to the above-mentioned configuration, when the target difference value is large in magnitude, the distribution control amounts of the braking forces of the control object wheels are corrected so that the ratio of the distribution control amount on the braking force decreasing side relative to that on the braking force increasing side is increased as compared to the case where the target difference value is small in magnitude. Therefore, the control of the braking force of the wheel on the braking force increasing side can be prevented from becoming unstable and an anti-skid control can be prevented from starting earlier for that wheel.

The above-mentioned configuration may be such that: when the target difference value exceeds an excessive reference value in magnitude, braking force distribution control amounts of the left and right wheels of the control object wheels are calculated on the basis of a value which corresponds to the excessive reference value and is included in the target difference value, and a braking force distribution control amount of the wheel which belongs to the control object wheels and is on the braking force decreasing side is increased in magnitude on the basis of the excessive amount by which the target difference value exceeds the excessive reference value in magnitude.

According to the configuration, in the situation where the target difference value exceeds the excessive reference value in magnitude, a braking force distribution control amount on the braking force increasing side of the control object wheels can be prevented from increasing excessively. Therefore, the control of the braking force of the wheel on the braking force increasing side can be prevented from becoming unstable and an anti-skid control can be prevented from starting earlier for that wheel. In addition, according to the above-mentioned configuration, in the situation where the target difference value does not exceed the excessive reference value in magnitude, the original braking force distribution control can be executed on the braking forces of the control object wheels to thereby effectively suppress the turning deviation of the vehicle.

The above-mentioned configuration may be such that: when a vehicle deceleration is high, a ratio of the target difference value relative to the reference difference value is increased in magnitude as compared to the case where a vehicle deceleration is low.

In general, the degree of turning deviation of a vehicle due to braking force difference between left and right wheels is not liable to happen when a vehicle deceleration is low, but is liable to happen when a vehicle deceleration is high. In addition, when a vehicle deceleration is low, the influence of a disturbance from a road becomes significant on the difference value between braking slip index values of the left and right wheels of the control reference wheels as compared to the case where a vehicle deceleration is high, resulting in that the braking forces of the control object wheels are liable to be unnecessarily corrected.

According to the above-mentioned configuration, when a vehicle deceleration is high, a ratio of the target difference value relative to the reference difference value is increased in magnitude as compared to the case where a vehicle deceleration is low. Therefore, in the situation where a vehicle deceleration is high, turning deviation of the vehicle can effectively be suppressed, and in the situation where a vehicle deceleration is low, a possibility can be reduced that the braking force distribution control amounts of the control object wheels excessively increase or braking force distribution is unnecessarily controlled.

The above-mentioned configuration may be such that: when friction coefficients of a road corresponding to the left and right wheels of the control reference wheels are different from each other, braking force distribution control amounts of the control object wheels are decreased in magnitude.

In general, in the situation where the friction coefficients of a road corresponding to the left and right wheels are different from each other, the degree of braking slip becomes higher on the side of lower friction coefficient than on the side of higher friction coefficient. For this reason, if a turning direction of a vehicle is determined on the basis of the magnitude relationship of the braking force index values of the left and right wheels of the control reference wheels, a determination is made that the vehicle is turning to the direction corresponding to the side of the lower friction coefficient of the road.

On the other hand, when the above-mentioned braking force distribution control is executed on the control object wheels, the braking forces of the control object wheels are corrected so that the degree of braking slip becomes higher on the side of lower friction coefficient than on the side of higher friction coefficient. Accordingly, the braking forces are controlled so that the braking force on the side of lower friction coefficient relatively increases as compared to the braking force on the side of higher friction coefficient, and, as a result, the execution of the braking force distribution control may encourage the turning of the vehicle which a driver does not intend.

By contrast, according to above-mentioned configuration, when friction coefficients of a road corresponding to the left and right wheels of the control reference wheels are different from each other, braking force distribution control amounts of the control object wheels are decreased in magnitude. Therefore, the possibility can be reduced that the execution of the braking force distribution control encourages the turning of the vehicle which a driver does not intend.

The above-mentioned configuration may be such that: a reference vehicle speed is calculated on the basis of the wheel speeds of the control reference wheels; target wheel speeds of the left and right wheels of the control object wheels are calculated on the basis of the reference vehicle speed and the target difference value; and braking forces of the left and right wheels of the control object wheels are controlled so that the wheel speeds of the left and right wheels of the control object wheels are made closer to the associated target wheel speeds.

According to the configuration, the wheel speeds of the left and right wheels of the control object wheels are controlled so that they are made closer to the associated target wheel speeds which are calculated on the basis of the reference vehicle speed and the target difference value. Therefore, the turning deviation of the vehicle can be suppressed by controlling the wheel speeds of the left and right wheels of the control object wheels in relation to the reference vehicle speed and the target difference value.

The above-mentioned configuration may be such that: the control reference wheels are front wheels and the control object wheels are rear wheels.

According to the configuration, since the control reference wheels are front wheels and the control object wheels are rear wheels, for a general vehicle in which the braking force sharing rate of the font wheels is higher than that of the rear wheels, the turning deviation of the vehicle can be suppressed with the vehicle behavior being prevented from changing rapidly.

The braking force distribution control device may be applied to a vehicle in which the braking forces of the wheels are controlled in accordance with at least braking demand.

The above-mentioned configuration may be such that: when change rate in the wheel braking slip index of at least one of the control reference wheels exceeds in magnitude a change rate reference value, the braking force distribution control on the control object wheels is prohibited.

The above-mentioned configuration may be such that: when friction coefficients of a road corresponding to the left and right wheels of the control reference wheels are different from each other, the braking force distribution control on the control object wheels is prohibited.

BRIEF DESCRIPTION OF THE DRAWINGS

FIG. 10 is a flowchart showing a routine of the braking force distribution control in the eighth embodiment of the braking force distribution control device for a vehicle according to the present invention.

DESCRIPTION OF EMBODIMENTS

Some preferred embodiments of the present invention will be described in detail with reference to the accompanying drawings.

First Embodiment

Figure 1:
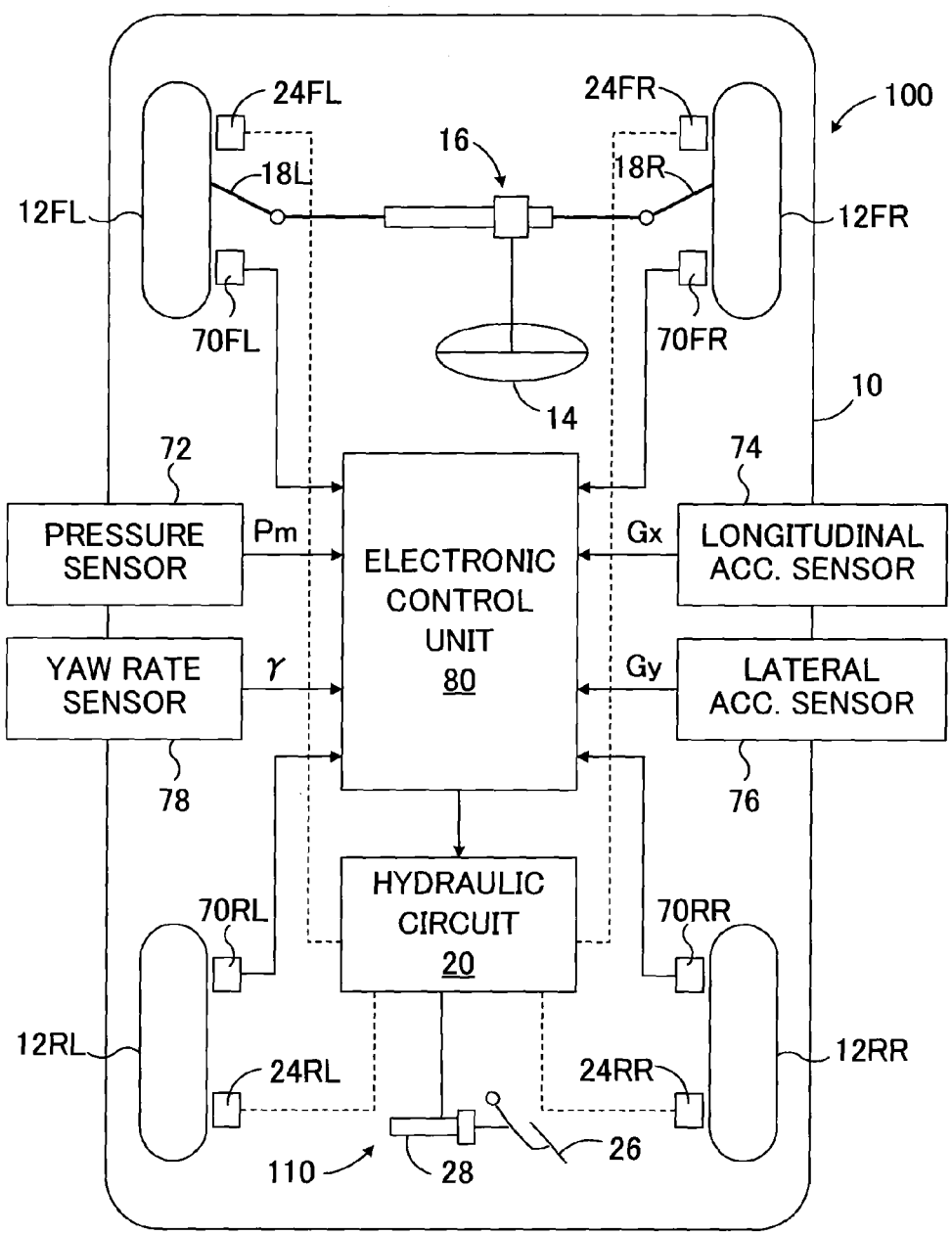
FIG. 1 is a schematic configurational view showing a first embodiment of a braking force distribution control device for a vehicle according to the present invention.
Figure 2:
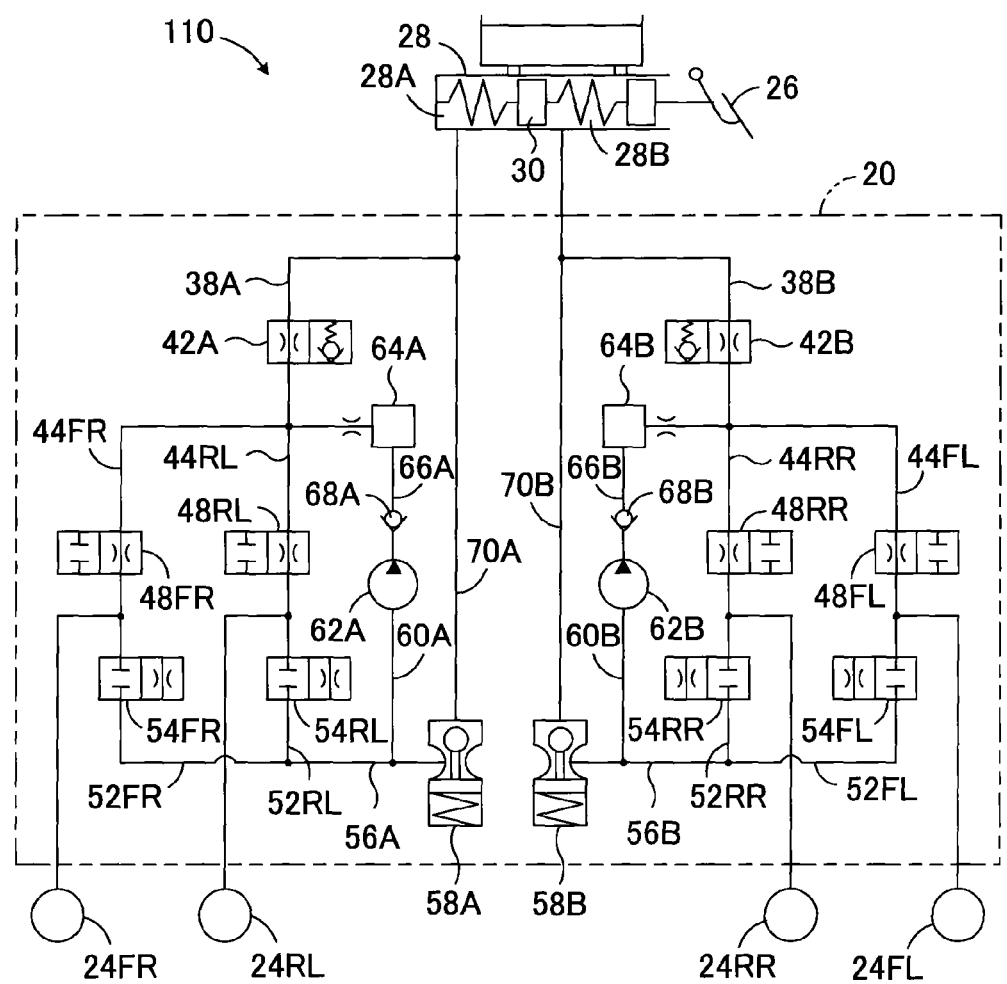
FIG. 2 is a diagram showing the braking apparatus shown in FIG. 1.

FIG. 1 is a schematic configurational view showing a first embodiment of a braking force distribution control device for a vehicle according to the present invention and FIG. 2 is a diagram showing the braking apparatus shown in FIG. 1.

Referring to FIG. 1, 100 denotes an entire braking force distribution control device for a vehicle 10. The vehicle 10 has a right front wheel 12FR, a left front wheel 12FL, a right rear wheel 12RR, and a left rear wheel 12RL. The right and left front wheels 12FR, 12FL, which are steerable wheels, are steered by a steering apparatus 16 of a rack and pinion type via right and left tie rods 18R and 18L, respectively. The steering apparatus is driven in response to steering operation of a steering wheel 14 by a driver.

Braking forces of the wheels are controlled through control of respective brake pressures, i.e. the internal pressures Pi (i=fr, fl, rr, rl) of respective wheel cylinders 24FR, 24FL, 24RR, 24RL by a hydraulic circuit 20 of a braking apparatus 110 serving as a braking actuator. As illustrated in FIG. 2, the braking apparatus 110 has a master cylinder 28 that supplies brake oil under pressure in response to a depressing operation of a brake pedal 26 by the driver. The master cylinder 28 has a first master cylinder chamber 28A and a second master cylinder chamber 28B defined by a free piston 30 urged into a predetermined position by a compression coil spring provided on each side of the free piston.

One ends of a first system brake pressure control line 38A and a second system brake pressure control line 38B are connected with the first master cylinder chamber 28A and the second master cylinder chamber 28B, respectively. The brake pressure control lines 38A and 38B connect the master cylinder chambers 28A and 28B with the hydraulic circuit 20.

The brake pressure control line 38A is provided with a first system communication control valve 42A, which is a solenoid valve of normally open type in the illustrated embodiment. The communication control valve 42A opens when its solenoid not shown in FIG. 2 is not supplied with drive current and closes when the solenoid is supplied with drive current. In particular, when the communication control valve 42A is open, it maintains a pressure difference so that the pressure on the side opposite to the master cylinder 28 is higher than that on the side of the master cylinder 28 and varies the pressure difference incrementally and decrementally according to a voltage of the drive current.

In other words, when a pressure difference across the communication control valve 42A is equal to or lower than a command pressure difference that is determined by a voltage of the drive current supplied to the solenoid, the communication control valve 42A maintains itself in the close condition. Thus, the communication control valve 42A prevents the oil serving as a working fluid from flowing from the side opposite to the master cylinder 28 toward the side of the master cylinder 28 via the communication control valve 42A to thereby prevent the pressure difference across the communication control valve 42A from decreasing. By contrast, when the pressure difference across the communication control valve 42A exceeds the command pressure difference, the communication control valve 42A opens. Thus, the communication control valve 42A allows the oil to flow from the side opposite to the master cylinder 28 toward the side of the master cylinder 28 via the communication control valve 42A to thereby control the pressure difference across the communication control valve 42A to the command pressure difference.

Brake pressure control lines 44FR and 44RL for the right front and left rear wheels, respectively are connected at their one ends to the other end of the first system brake pressure control line 38A. The brake pressure control lines 44FR and 44RL for the right front and left rear wheels, respectively are connected at their other ends with wheel cylinders 24FR and 24RL for controlling braking forces of the right front and left rear wheels, respectively. Electromagnetic on-off valves 48FR and 48RL of normally open type are provided midway in the brake pressure control lines 44FR and 44RL for the right front and left rear wheels, respectively.

An oil discharge line 52FR is connected at its one end to the brake pressure control lines 44FR between the electromagnetic on-off valve 48FR and the wheel cylinder 24FR. Similarly, an oil discharge line 52RL is connected at is one end to the brake pressure control lines 44RL between the electromagnetic on-off valve 48RL and the wheel cylinder 24RL. Electromagnetic on-off valves 54FR and 54RL of normally closed type are provided midway in the oil discharge lines 52FR and 52RL, respectively. The oil discharge lines 52FR and 52RL are connected at their other ends to a first system reservoir 58A for pooling the oil by a connecting line 56A.

As is apparent from the above, the electromagnetic on-off valves 48FR and 48RL are pressure increasing valves for selectively increasing and maintaining the pressures in the wheel cylinders 24FR and 24RL, respectively. By contrast, the electromagnetic on-off valves 54FR and 54RL are pressure decreasing valves for selectively decreasing the pressures in the wheel cylinders 24FR and 24RL, respectively. Thus, the electromagnetic on-off valves 48FR and 54FR cooperate with each other to define pressure increasing and decreasing valves, respectively that selectively increase, decrease and maintain the pressure in the wheel cylinder 24FR of the right front wheel. Similarly, the electromagnetic on-off valves 48RL and 54RL cooperate with each other to define pressure increasing and decreasing valves, respectively that selectively increase, decrease and maintain the pressure in the wheel cylinder 24RL of the left rear wheel.

The connecting line 56A is connected to the intake side of a pump 62A by a connecting line 60A. The discharge side of the pump 62A is connected to the other end of the brake pressure control line 38A by a connecting line 66A having a damper 64A midway therein. A check valve 68A is provided in the connecting line 66A between the pump 62A and the damper 64A. The check valve allows the oil to flow only from the pump 62A toward the damper 64A.

In similar, the brake pressure control line 38B is provided with a second system communication control valve 42B, which is also a solenoid valve of normally open type in the illustrated embodiment and operates similarly to the communication control valve 42A. Thus, by means of controlling the voltage of the drive current supplied to the solenoid not shown in FIG. 2, the oil can be restricted to flow from the side of the wheel cylinders 24FL and 24RR to the side of the master cylinder 28 via the communication control valve 42B and a pressure difference across the communication control valve 42B can be controlled to a command pressure difference.

Brake pressure control lines 44FL and 44RR for the left front and right rear wheels, respectively are connected at their one ends to the other end of the second system brake pressure control line 38B. The brake pressure control lines 44FL and 44RR for the left front and right rear wheels, respectively are connected at their other ends with wheel cylinders 24FL and 24RR for controlling braking forces of the left front and right rear wheels, respectively. Electromagnetic on-off valves 48FL and 48RR of normally open type are provided midway in the brake pressure control lines 44FL and 44RR for the left front and right rear wheels, respectively.

An oil discharge line 52FL is connected at its one end to the brake pressure control lines 44FL between the electromagnetic on-off valve 48FL and the wheel cylinder 24FL. Similarly, an oil discharge line 52RR is connected at its one end to the brake pressure control lines 44RR between the electromagnetic on-off valve 48RR and the wheel cylinder 24RR. Electromagnetic on-off valves 54FL and 54RR of normally closed type are provided midway in the oil discharge lines 52FL and 52RR, respectively. The oil discharge lines 52FL and 52RR are connected at their other ends to a second system reservoir 58B for pooling the oil by a connecting line 56B.

As is apparent from the above, the electromagnetic on-off valves 48FL and 48RR are pressure increasing valves for selectively increasing and maintaining the pressures in the wheel cylinders 24FL and 24RR, respectively. By contrast, the electromagnetic on-off valves 54FL and 54RR are pressure decreasing valves for selectively decreasing the pressures in the wheel cylinders 24FL and 24RR, respectively. Thus, the electromagnetic on-off valves 48FL and 54FL cooperate with each other to define pressure increasing and decreasing valves, respectively that selectively increase, decrease and maintain the pressure in the wheel cylinder 24FL of the left front wheel. Similarly, the electromagnetic on-off valves 48RR and 54RR cooperate with each other to define pressure increasing and decreasing valves, respectively that selectively increase, decrease and maintain the pressure in the wheel cylinder 24RR of the right rear wheel.

Although not shown in FIG. 2, the electromagnetic on-off valves 48FL-48RR have therein check valves which allow the oil to flow only from the side of the associated wheel cylinders toward the side of the master cylinder. When the pressure on the side of the associated wheel cylinder is higher than the pressure on the side of the master cylinder by a preset value, the associated check valve opens to decrease the pressure on the side of the associated wheel cylinder.

The connecting line 56B is connected to the intake side of a pump 62B by a connecting line 60B. The discharge side of the pump 62B is connected to the other end of the brake pressure control line 38B by a connecting line 66B having a damper 64B midway therein. A check valve 68B is provided in the connecting line 66B between the pump 62B and the damper 64B. The check valve allows the oil to flow only from the pump 62B toward the damper 64B.

The reservoirs 58A and 58B are connected to the brake pressure control lines 38A and 38B between the master cylinder 28 and the communication control valves 42A and 42B by connecting lines 70A and 70B, respectively. Thus, the reservoirs 58A and 58B allow the oil to flow between the master cylinder chambers 28A, 28B and the reservoirs 58A, 58B, respectively, when the associated communication control valves 42A and 42B are closed. The reservoirs 58A and 58B have free pistons which are fixed with valve bodies of check valves, which prevent the oil volumes in the reservoirs 58A and 58B from exceeding a reference value.

According to the illustrated embodiment, each of the control valves and the on-off valves is set to a non-control position, as shown in FIG. 2, when no drive current is supplied to its solenoid. Accordingly, the pressure in the first master cylinder chamber 28A is supplied to the wheel cylinders 24FR and 24RL, and the pressure in the second master cylinder chamber 28B is supplied to the wheel cylinders 24FL and 24RR. Therefore, during normal operation, the pressure in the wheel cylinder of each wheel, i.e. the braking force generated thereby is selectively increased and decreased in accordance with the depression force on the brake pedal 26.

In contrast, when the pumps 62A and 62B are driven in a state where the communication control valves 42A and 42B are switched to a closed position and the on-off valves of the wheels are in the positions shown in FIG. 2, the oil in the reservoirs 58A and 58B is pumped up by the pumps. Accordingly, the pressure generated by the pump 62A is supplied to the wheel cylinders 24FR and 24RL, and the pressure generated by the pump 62B is supplied to the wheel cylinders 24FL and 24RR. Therefore, the brake pressure of each wheel is selectively increased and decreased by selectively opening and closing the communication control valves 42A and 42B and the on-off valve (pressure increasing and decreasing valve) of each wheel regardless of the depression force on the brake pedal 26.

In this case, the pressure in each wheel cylinder is increased when the on-off valves 48FR-48RL and the on-off valves 54FR-54RL are in non-control positions shown in FIG. 2 (pressure increasing mode). The pressure in each wheel cylinder is maintained when the on-off valves 48FR-48RL are switched to closed positions and the on-off valves 54FR-54RL are in non-control positions shown in FIG. 2 (pressure maintaining mode). The pressure in each wheel cylinder is decreased when the on-off valves 48FR-48RL are switched to closed positions and the on-off valves 54FR-54RL are switched to open positions (pressure decreasing mode).

Although not shown in FIG. 2, each wheel is provided with a braking force generation device including, for example, a caliper and a brake rotor. The pressure in each wheel cylinder is converted into a braking force by the braking force generation device. Under the situation where the braking forces of the wheels are not individually controlled, a ratio between the braking forces Fbf of the front wheels and the braking forces Fbr of the rear wheels, i.e. a braking force sharing rate of the front and rear wheels is Cf:Cr wherein Cf and Cr are positive constants which satisfy the relationship that Cf is larger than Cr. Therefore, the front wheels are control reference wheels having the higher braking force sharing rate and the rear wheels are control object wheels having the lower braking force sharing rate.

The communication control valves 42A and 42B, the on-off valves 48FR-48RL, the on-off valves 54FR-54RL, and electric motors for driving the pumps 62A and 62B are controlled as described hereinafter by an electronic control unit 80. Although not shown in FIG. 1, the electronic control unit 80 is constituted by a microcomputer and a drive circuit. The microcomputer may be any of a typical configuration which has a CPU, a RAM and a ROM and is well known in the technical field.

The wheel 12FR-12RL are provided with wheel speed sensors 70FR-70RL, respectively, which detect the associated wheel speeds Vi (i=fr, fl, rr, rl) and the master cylinder 28 is provided with a pressure sensor 72 which detects a master cylinder pressure Pm. The vehicle 10 is provided with a longitudinal acceleration sensor 74 which detects a longitudinal acceleration Gx of the vehicle, a lateral acceleration sensor 76 which detects a lateral acceleration Gy of the vehicle, and a yaw rate sensor 78 which detects a yaw rate $\gamma$ of the vehicle. Signals indicative of the values detected by the sensors are input to the electronic control unit 80. It is to be noted that the longitudinal acceleration sensor 74 detects a longitudinal acceleration Gx which is deemed to be positive when it is in accelerating direction. The lateral acceleration sensor 76 and the yaw rate sensor 78 detects a lateral acceleration Gy and a yaw rate $\gamma$, respectively which are deemed to be positive when the vehicle turns left.

The electronic control unit 80 calculates a reference vehicle speed Vref on the basis of the wheel speeds Vfl and Vfr of the left and right front wheels, respectively, and calculates a wheel speed difference $\Delta$Vf (=Vfr−Vfl) of the left and right front wheel speeds as a reference difference value of the wheel speeds. When neither of the left and right front wheels is controlled for anti-skid, the reference vehicle speed Vref is set to the higher one of the wheel speeds Vfl and Vfr of the left and right front wheels. In contrast, one of the left and right front wheels is controlled for anti-skid, the reference vehicle speed Vref is set to the wheel speed Vfl or Vfr of the wheel which is not controlled for anti-skid.

The electronic control unit 80 calculates a target wheel speed difference $\Delta$Vrt of the left and right rear wheels, i.e. the difference between a target wheel speed Vrrt of the right rear wheel and a target wheel speed Vrlt of the left rear wheel on the basis of the wheel speed difference $\Delta$Vf according to the following formula 1. It is to be noted that the coefficient Rpx0 in the formula 1 is a positive constant expressed by the following formula 2. In the formula 2, Pf0 and Pr0 are standard values of wheel load of the front and rear wheels, respectively, and $\Delta$Pf0 and $\Delta$Pr0 are standard values of wheel load variation of the front and rear wheels, respectively caused due to longitudinal load shift when the vehicle is under braking.

$$\Delta Vrt = -Rpx0 \Delta Vf \qquad (1)$$

$$Rpx0 = (Pr0 + \Delta Pr0)/(Pf0 + \Delta Pf0) \qquad (2)$$

As is understood from the above formula 1, the target wheel speed difference $\Delta$Vrt is calculated so that the magnitude relationship between target wheel speeds of the left and right rear wheels is opposite to that between target wheel speeds of the left and right front wheels. For example, when the wheel speed Vfr of the right front wheel is higher than the wheel speed Vfl of the left front wheel, a target wheel speed Vrlt of the left rear wheel becomes higher than a target wheel speed Vrrt of the right rear wheel. The target wheel speed difference $\Delta$Vrt is calculated so that the a ratio of the target wheel speed difference $\Delta$Vrt relative to the target wheel speed difference $\Delta$Vft in magnitude becomes a standard value Rpx0 of a wheel load ratio of the rear wheels relative to the front wheels when the vehicle is under braking.

The electronic control unit 80 also calculates target wheel speeds Vrlt and Vrrt of the left and right rear wheels on the basis of a reference vehicle speed Vref and the target wheel speed difference $\Delta$Vrt of the left and right rear wheels according to the formulas 3 and 4, respectively.

$$Vrlt = Vref - \Delta Vrt/2 \qquad (3)$$

$$Vrrt = Vref + \Delta Vrt/2 \qquad (4)$$

The electronic control unit 80 further controls brake pressures of the left and right rear wheels to control the braking forces thereof on the basis of the wheel speeds Vrl, Vrr and the target wheel speeds Vrlt, Vrrt of the left and right rear wheels so that the wheel speeds of the left and right rear wheels get closer to the associated target wheel speeds.

Figure 3:
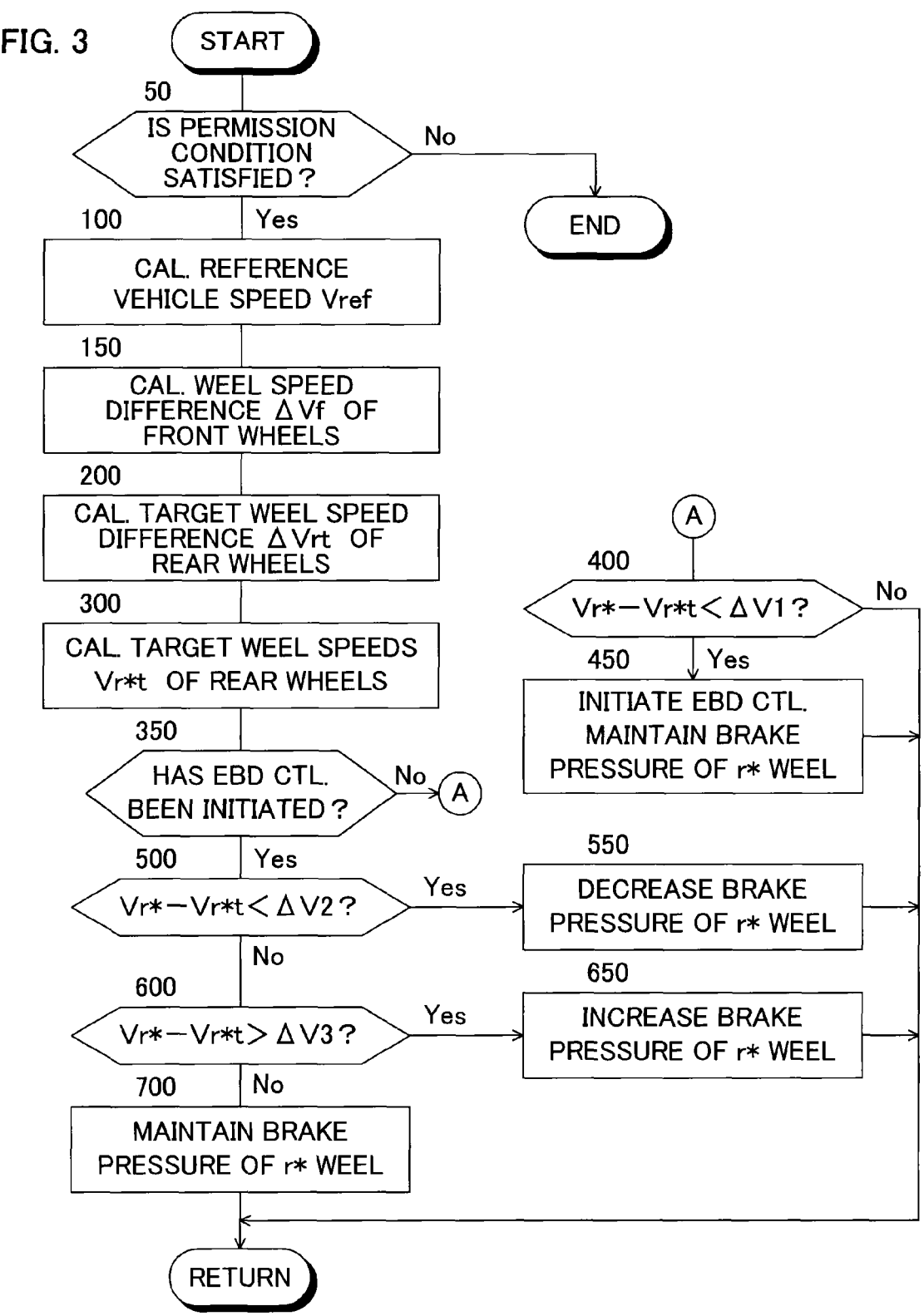
FIG. 3 is a flowchart showing a routine of the braking force distribution control in first embodiment.

Next, the routine for achieving a braking force distribution control (EBD control) in the first embodiment will be described with reference to the flowchart shown in FIG. 3. The control process according to the flowchart shown in FIG. 3 is initiated upon a closing (ON) of an ignition switch (not shown) and is performed repeatedly at predetermined time intervals. It is to be noted that when braking forces of the wheels becomes necessary to be individually controlled such as for an anti-ski control and a vehicle dynamic control in the situation where a longitudinal braking force distribution control is being executed, the longitudinal braking force distribution control is stopped.

First, in step 50, a decision is made as to whether or not a condition for permitting the braking force distribution control is satisfied. If a negative decision is made, the control according to the flow chart shown in FIG. 3 is ended, whereas if an affirmative decision is made, the control proceeds to step 100. Notably, a decision may be made that a condition for permitting the braking force distribution control is satisfied when braking operation is conducted by a driver; at least one of the left and right front wheels is not controlled for anti-skid; and neither of the left and right rear wheels is controlled for anti-skid.

In step 100, a reference vehicle speed Vref is calculated on the basis of wheel speeds Vfl, Vfr of the left and right front wheels, and in step 150, a wheel speed difference ΔVf (=Vfr−Vfl) of the left and right front wheels is calculated as a reference difference value of the wheel speeds.

In step 200, a target wheel speed difference ΔVrt of the left and right rear wheels, i.e. the difference between a target wheel speed Vrrt of the right rear wheel and a target wheel speed Vrlt of the left rear wheel is calculated on the basis of the wheel speed difference ΔVf according to the above formula 1.

In step 300, target wheel speeds Vrlt and Vrrt of the left and right rear wheels are calculated on the basis of the reference vehicle speed Vref and the target wheel speed difference ΔVrt of the left and right rear wheels according to the above-mentioned formulas 3 and 4, respectively.

After completion of step 300, step 350 and the following steps are conducted for the left and right rear wheels. For example, first, step 350 and the following steps are conducted for the left rear wheel (*=l) and subsequently, step 350 and the following steps are conducted for the right rear wheel (*=r). In the following description, r* means rl and rr. Accordingly, r* wheel means rl wheel (the left rear wheel) or rr wheel (the right rear wheel).

In step 350, a decision is made as to whether or not the EBD control has been initiated for r* wheel and brake pressures are individually controlled by the pressure increasing and decreasing valves, i.e. step 450 which is described later has been conducted for r* wheel. If an affirmative decision is made, the control proceeds to step 500, whereas if a negative decision is made, the control proceeds to step 400.

In step 400, a decision is made as to whether or not a difference between a wheel speed Vr* of r* wheel and its target wheel speed Vr*t is smaller than a first reference value ΔV1 (a negative constant). If a negative decision is made, the control is ended, whereas if an affirmative decision is made, the control proceeds to step 450.

In step 450, the EBD control is initiated for r* wheel and brake pressure of r* wheel is maintained by closing the pressure increasing valve 48RL or 48RR of r* wheel.

In step 500, a decision is made as to whether or not a difference between a wheel speed Vr* of r* wheel and its target wheel speed Vr*t is smaller than a second reference value ΔV2 (a negative constant which is smaller than the first reference value ΔV1). If a negative decision is made, the control proceeds to step 600, whereas if an affirmative decision is made, the control proceeds to step 550.

In step 550, brake pressure of r* wheel is decreased by opening the pressure decreasing valve 54RL or 54RR of r* wheel in the situation where the associated pressure increasing valve 48RL or 48RR of r* wheel is closed.

In step 600, a decision is made as to whether or not a difference between a wheel speed Vr* of r* wheel and its target wheel speed Vr*t is larger than a third reference value ΔV3. If a negative decision is made, the control proceeds to step 700, whereas if an affirmative decision is made, the control proceeds to step 650. The third reference value ΔV3 is a constant which is larger than the first reference value ΔV1. Whether the third reference value is positive or negative depends on the specification of the vehicle.

In step 650, brake pressure of r* wheel is increased by opening the pressure increasing valve 48RL or 48RR of r* wheel in the situation where the associated pressure decreasing valve 54RL or 54RR of r* wheel is closed.

In step 700, brake pressure of r* wheel is maintained by closing the pressure increasing valve 48RL or 48RR of r* wheel in the situation where the associated pressure decreasing valve 54RL or 54RR of r* wheel is closed.

As is understood from the above descriptions, according to the first embodiment, a target wheel speed difference ΔVrt of the left and right rear wheels is calculated on the basis of the wheel speed difference ΔVf of the left and right front wheels. In particular, the target wheel speed difference ΔVrt is calculated so that the target wheel speeds of the left and right rear wheels have the converse relationship in magnitude to those of the left and right front wheels and a ratio of the target wheel speed difference ΔVrt relative to the wheel speed difference ΔVf becomes the coefficient Rpx0.

Then, target wheel speeds Vrlt and Vrrt of the left and right rear wheels are calculated on the basis of the reference vehicle speed Vref and the target wheel speed difference ΔVrt of the left and right rear wheels, and wheel speeds Vrl and Vrr of the left and right rear wheels are controlled so that they are made closer to the associated target wheel speeds Vrlt and Vrrt.

Thus, according to the first embodiment, the magnitude relationship in braking slip of the left and right rear wheels can be controlled so that it is converse to that of the left and right front wheels. Therefore, if the braking forces of the front and rear wheels are added to each other to consider the vehicle as a two-wheel vehicle having left and right wheels, braking slips of the left and right wheels can be made closer to each other to thereby effectively suppress the turning deviation of the vehicle. The effect can as well be obtained in the other embodiments which are described later.

According to the first embodiment, since the braking slip index value is a wheel speed, as compared with the case where the index of braking slip is a braking slip amount or a braking slip rate, calculation amounts and calculation load on a calculation unit can be reduced. The effect can as well be obtained in the other embodiments which are described later.

According to the first embodiment, the coefficient Rpx0 is a standard value of wheel load ratio of rear wheels relative to the front wheels when the vehicle is under braking. Accordingly, as compared with the case where the coefficient Rpx0 is a standard value of wheel load ratio of rear wheels relative to the front wheels when the vehicle is stationary, for example, the ratio of target wheel speed difference ΔVrt relative to the wheel speed difference ΔVf in magnitude can be made closer to an actual ratio during braking. The braking force distribution control can be more simply executed as compared to the second embodiment described later in which a wheel load ratio of rear wheels relative to the front wheels is estimated and the ratio of ΔVrt relative to ΔVf is controlled in accordance with the result of the estimation. The effect can as well be obtained in the third to eighth embodiments which are described later.

Second Embodiment

Figure 4:
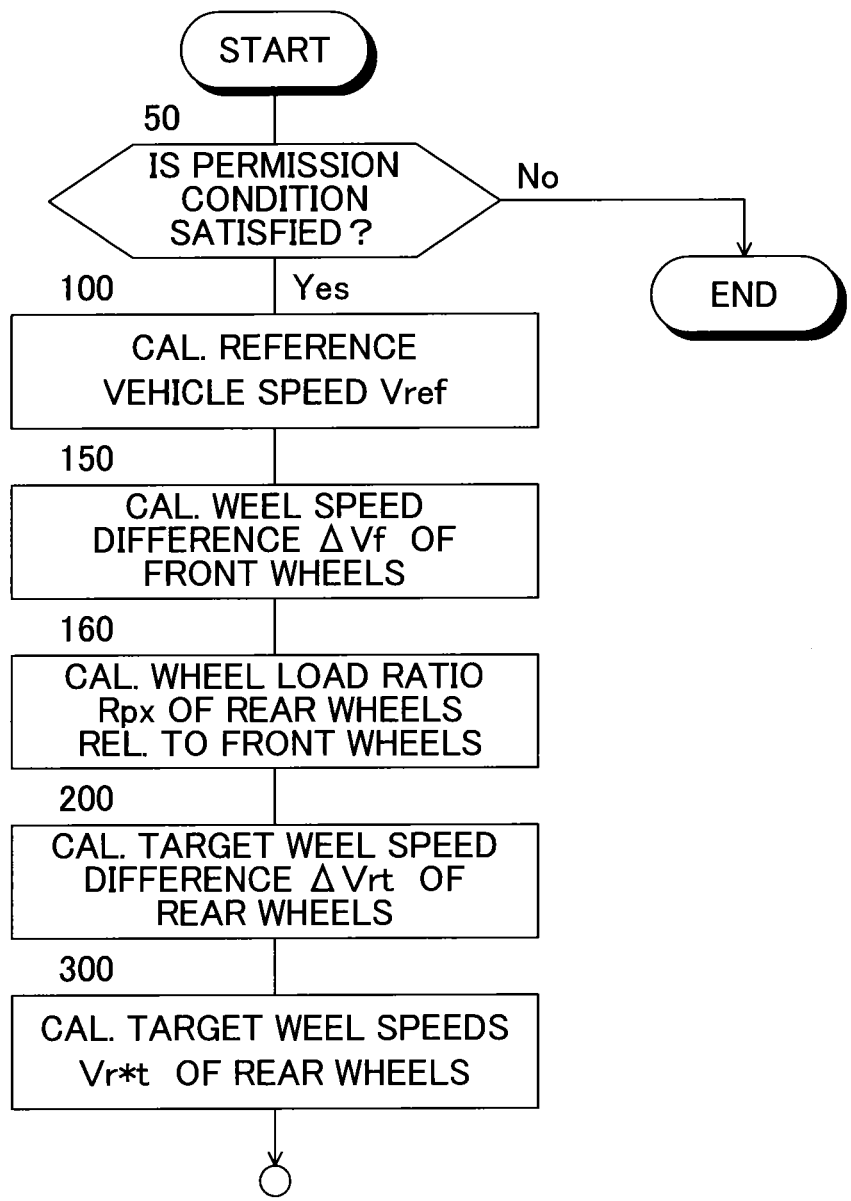
FIG. 4 is a flowchart showing a routine of the braking force distribution control in the second embodiment of the braking force distribution control device for a vehicle according to the present invention.

FIG. 4 is a flowchart showing a routine of the braking force distribution control in the second embodiment of the braking force distribution control device for a vehicle according to the present invention. In FIG. 4, the same steps as those shown in FIG. 3 are denoted by the same step numbers as in FIG. 3. The same goes for the figures for the other embodiment to be described later.

In the second embodiment, after completion of step 150, step 160 is conducted and after completion of step 160, the control proceeds to step 200. The steps other than steps 160 and 200 are conducted in the similar manner as in the above-described first embodiment.

In step 160, a wheel load ratio Rpx of the rear wheels relative to the front wheels is estimated. Notably, a wheel load ratio Rpx may be estimated in any manner. For example, a longitudinal load shift of the vehicle may be estimated on the basis of a wheel base of the vehicle, a height of the gravity center of the vehicle, and a longitudinal acceleration Gx of the vehicle, and a wheel load ratio may be estimated on the basis of standard wheel loads of the front and rear wheels and the estimated longitudinal load shift.

In step 200, a target wheel speed difference $\Delta Vrt$ of the left and right rear wheels, i.e. the difference between a target wheel speed Vrrt of the right rear wheel and a target wheel speed Vrlt of the left rear wheel is calculated on the basis of the wheel speed difference $\Delta Vf$ and the wheel load ratio Rpx according to the following formula 5.

$$\Delta Vrt = -Rpx \Delta Vf \quad (5)$$

Thus, according to the second embodiment, not only turning deviation of the vehicle can effectively be suppressed as in the first embodiment, but also the braking force distribution of the front and rear wheels can be controlled in accordance with the actual wheel load ratio of the front and rear wheels. Therefore, even in the situation where the actual wheel load ratio of the front and rear wheels is different from a standard wheel load ratio due to the change in the vehicle occupants condition and/or movable load condition, the braking force distribution of the front and rear wheels can optimally be controlled in accordance with the actual wheel load ratio of the front and rear wheels regardless of the magnitudes and variation of the braking forces.

Third Embodiment

Figure 5:
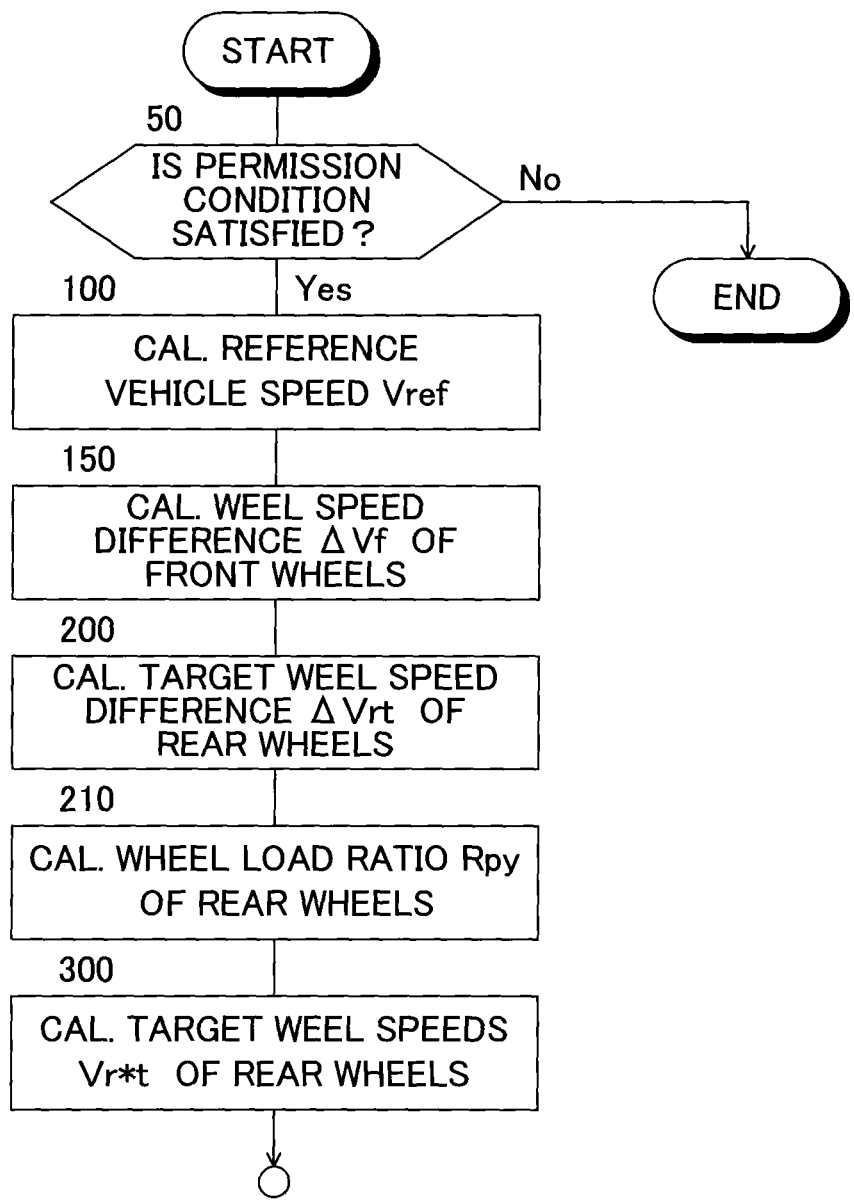
FIG. 5 is a flowchart showing a routine of the braking force distribution control in the third embodiment of the braking force distribution control device for a vehicle according to the present invention.

FIG. 5 is a flowchart showing a routine of the braking force distribution control in the third embodiment of the braking force distribution control device for a vehicle according to the present invention.

In the third embodiment, after completion of step 200, step 210 is conducted and after completion of step 210, the control proceeds to step 300. The steps other than steps 210 and 300 are conducted in the similar manner as in the above-described first embodiment.

In step 210, a wheel load ratio Rpy of the right rear wheel relative to the left rear wheel is estimated. The wheel load ratio Rpy may be estimated in any manner. For example, a lateral load shift of the vehicle may be estimated on the basis of a tread of the vehicle, the height of the vehicle gravity center, and a lateral acceleration Gy of the vehicle, and a wheel load ratio may be estimated on the basis of standard wheel loads of the left and right wheels and the estimated lateral load shift.

In step 300, target wheel speeds Vrlt and Vrrt of the left and right rear wheels are calculated on the basis of the reference vehicle speed Vref and the target wheel speed difference $\Delta Vrt$ of the left and right rear wheels according to the formulas 6 and 7, respectively.

$$Vrlt = Vref - (1 - Rpy) \Delta Vrt / 2 \quad (6)$$

$$Vrrt = Vref + Rpy \Delta Vrt / 2 \quad (7)$$

Thus, according to the third embodiment, not only turning deviation of the vehicle can effectively be suppressed as in the first embodiment, but also the braking force distribution of the left and right rear wheels can be controlled in accordance with the actual wheel load ratio of the left and right rear wheels. Therefore, even in the situation where the actual wheel load ratio of the left and right rear wheels is different from 1 due to the change in the vehicle occupants condition and/or movable load condition or in the situation where lateral load shift is caused by turning, the braking force distribution of the left and right rear wheels can optimally be controlled in accordance with the actual wheel load ratio of the left and right rear wheels.

Fourth Embodiment

Figure 6:
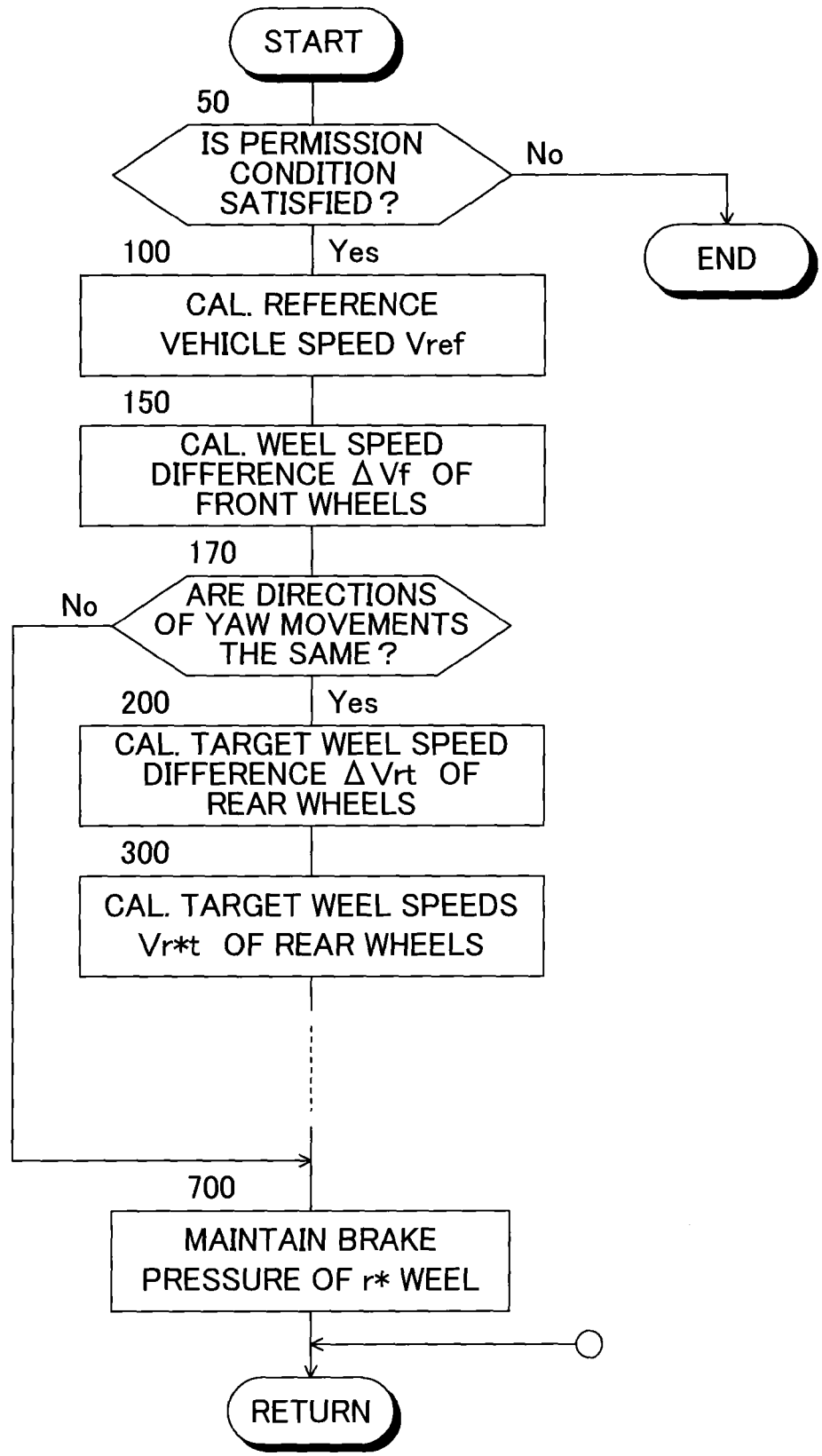
FIG. 6 is a flowchart showing a routine of the braking force distribution control in the fourth embodiment of the braking force distribution control device for a vehicle according to the present invention.

FIG. 6 is a flowchart showing a routine of the braking force distribution control in the fourth embodiment of the braking force distribution control device for a vehicle according to the present invention.

In the fourth embodiment, after completion of step 150, step 170 is conducted. The steps other than step 170 are conducted in the similar manner as in the above-described first embodiment.

In step 170, directions of yaw movement of the vehicle are estimated on the basis of a wheel speed difference $\Delta Vf$ of the left and right front wheels and on the basis of a yaw rate $\gamma$ of the vehicle, and a decision is made as to whether or not the two estimated directions are the same. If a negative decision is made, the control is ended, whereas if an affirmative decision is made, the control proceeds to step 200.

It is to be noted that in the situation where one of the vehicle movement estimated on the basis of a wheel speed difference $\Delta Vf$ of the left and right front wheels and a yaw rate $\gamma$ of the vehicle is a yaw movement but the other is not a yaw movement, the decision made in step 170 is negative.

Thus, according to the fourth embodiment, not only turning deviation of the vehicle can effectively be suppressed as in the first embodiment, but also the braking force distribution control can be prevented from being executed in the situation where the two estimated directions of vehicle yaw movement are not the same.

For example, if braking operation is conducted when a vehicle is running on a so called split-μ road where the friction coefficient of the road on the side of turning inner wheels is higher than that on the side of turning outer wheels, the wheel speed of the turning outer front wheel may be lower than that of the turning inner front wheel. Then, the magnitude relationship of wheel speeds of the left and right front wheels are converse to that of wheel speeds of the left and right front wheels in the situation where the vehicle is turning on a road which is not a split-μ road. Therefore, if the braking force distribution control is executed in the same manner as in the first embodiment in that situation, the wheel speed of the turning outer rear wheel becomes higher and the wheel speed of the turning inner rear wheel becomes lower as compared with the case where the braking force distribution control is not executed. Accordingly, a tendency of the vehicle to spin is encouraged.

By contrast, according to the fourth embodiment, in such a situation, the braking force distribution control can be blocked from being executed to thereby reliably prevent a tendency of the vehicle to spin from being encouraged due to the execution of the braking force distribution control.

Even in the situation where a vehicle is turning and a yaw rate $\gamma$ is a value indicating that the vehicle is turning, the wheel speeds of the left and right front wheels can be substantially the same to each other due to the cause that a road is a split-μ road. In contrast, even in the situation where a vehicle is running straight and a yaw rate $\gamma$ is 0 which indicates that the vehicle is running straight, the wheel speeds of the left and right front wheels can be different from each other due to the cause that a road is a split-μ road and may implies that the vehicle is turning.

According to the fourth embodiment, in the situation where one of the estimated vehicle movements is a yaw movement and the other is not a yaw movement, the braking force distribution control is not as well executed. Accordingly, in the situation where one of the estimated vehicle movements is a yaw movement and the other is not a yaw movement due to the cause that a road is a split-μ road, the braking force distribution control can be prevented from being executed to thereby prevent the vehicle running condition from becoming unstable.

It is to be noted that while step 170 is conducted between steps 150 and 200, it may be conducted at any stage as long as it is conducted after the affirmative decision made in step 50 and before step 350.

Fifth Embodiment

Figure 7:
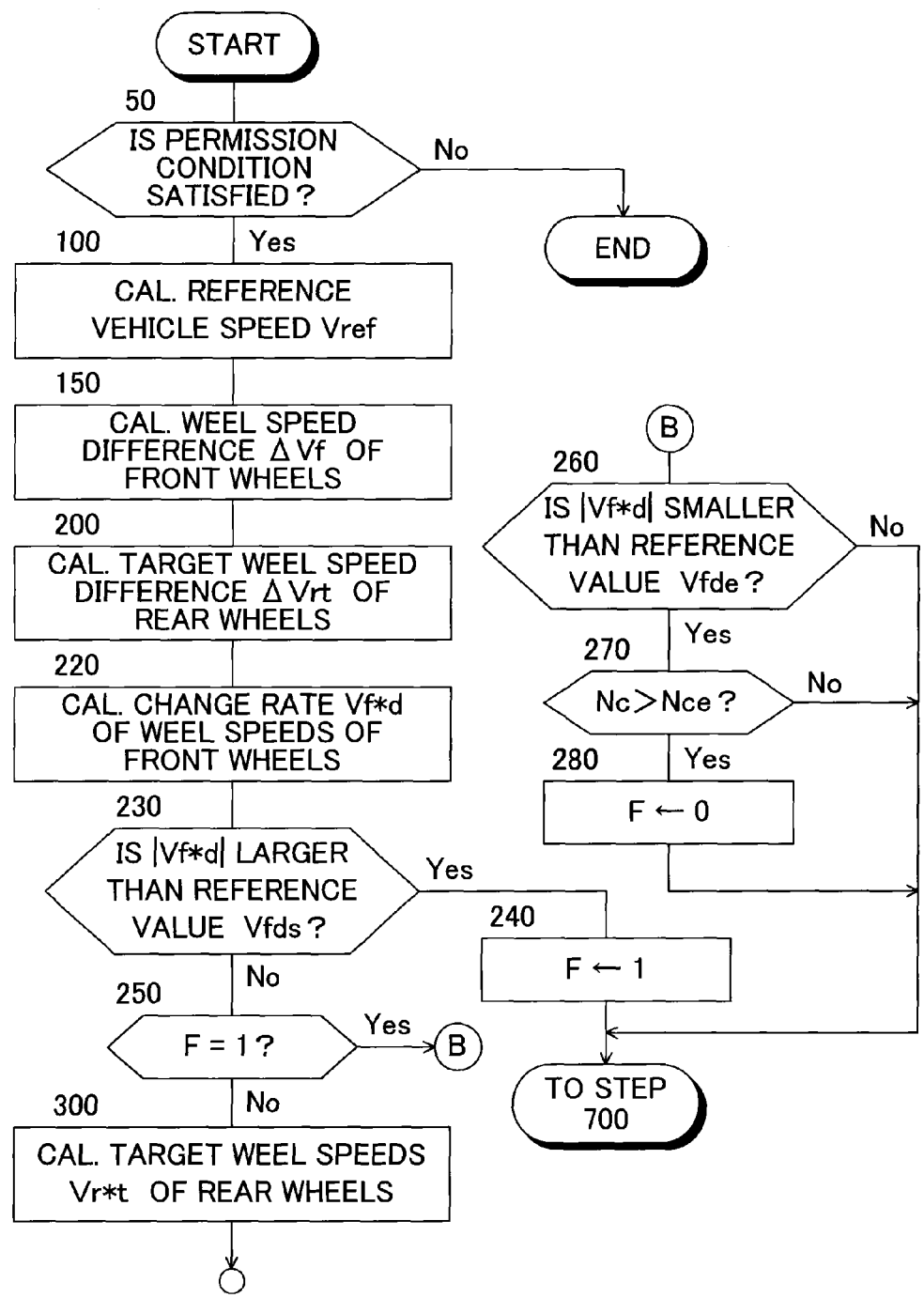
FIG. 7 is a flowchart showing a routine of the braking force distribution control in the fifth embodiment of the braking force distribution control device for a vehicle according to the present invention.

FIG. 7 is a flowchart showing a routine of the braking force distribution control in the fifth embodiment of the braking force distribution control device for a vehicle according to the present invention.

In the fifth embodiment, after completion of step 200, steps 220 and 230 are conducted, and steps 240-280 are conducted according to the circumstances. The steps other than these steps are conducted in the similar manner as in the above-described first embodiment. It is to be noted that at the beginning of the control, a flag F and a count value Nc to be mentioned later are initialized to 0 prior to step 50.

In step 220, change rates Vfld and Vfrd of the wheel speeds of the left and right front wheels are calculated to be time differential values of the wheel speeds Vfl and Vfr of the left and right front wheels.

In step 230, a decision is made as to whether or not at least one of the change rates Vfld and Vfrd of the wheel speeds of the left and right front wheels is larger in magnitude than a reference value Vfds for stopping the control (a positive constant). If a negative decision is made, the control proceeds to step 250, whereas if an affirmative decision is made, in step 240 the flag F is set to 1 so as to indicate that the control is stopped and, subsequently, the control proceeds to step 700.

In step 250, a decision is made as to whether or not the flag is 1, i.e. whether or not the control is stopped. If a negative decision is made, the control proceeds to step 300, whereas if an affirmative decision is made, the control proceeds to step 260.

In step 260, a decision is made as to whether or not both of the change rates Vfld and Vfrd of the wheel speeds of the left and right front wheels are larger in magnitude than a reference value Vfde for unbanning the stopping of the control (a positive constant smaller than the reference value Vfds). If a negative decision is made, the control proceeds to step 700, whereas if an affirmative decision is made, the control proceeds to step 270.

In step 270, a decision is made as to whether or not the count value Nc which indicates the number of affirmative decisions conducted successively in step 260 exceeds a reference value Nce. If a negative decision is made, the control proceeds to step 700, whereas if an affirmative decision is made, in step 280 the flag F is reset to 0 and, subsequently, the control proceeds to step 700.

In general, in such a situation as a front wheel passes over a stepped road surface, the wheel speed of the front wheel rapidly changes transiently. For this reason, if a target wheel speed difference ΔVrt of the left and right rear wheels is calculated on the basis of the wheel speed difference ΔVf of the left and right front wheels and the distribution of the braking forces is controlled on the basis of the calculation result in such a situation, there is a possibility that stability of the vehicle may be actually decreased.

According to the fifth embodiment, not only turning deviation of the vehicle can effectively be suppressed as in the first embodiment, but also the braking force distribution control can be prevented from inappropriately executed in such a situation where the wheel speed of a front wheel rapidly changes. Therefore, in such a situation as a front wheel passes over a stepped road surface, the braking force distribution control can be prevented from inappropriately executed and stability of the vehicle can be prevented from being actually decreased due to inappropriate execution of the control.

In particular, according to the fifth embodiment, the decision as to whether or not at least one of the change rates of the wheel speeds are large in magnitude is made in step 230 for both deceleration and acceleration. Accordingly, in either situation where a front wheel climbs up or climbs down a stepped road surface, the braking force distribution control can be prevented from being inappropriately executed.

In the embodiment, when an affirmative decision is made in step 230, the brake pressures of the rear wheels are maintained in step 700 until an affirmative decision is made in step 270. However, a modification may be made that when an affirmative decision is made in step 230, the braking force distribution control is executed with the target wheel speeds of the left and right rear wheels being decreasingly corrected until an affirmative decision is made in step 270.

It is to be noted that while steps 220-250 are conducted between steps 200 and 300, they may be conducted at any stage as long as they are conducted after the affirmative decision made in step 50 and prior to step 350.

Sixth Embodiment

Figure 8:
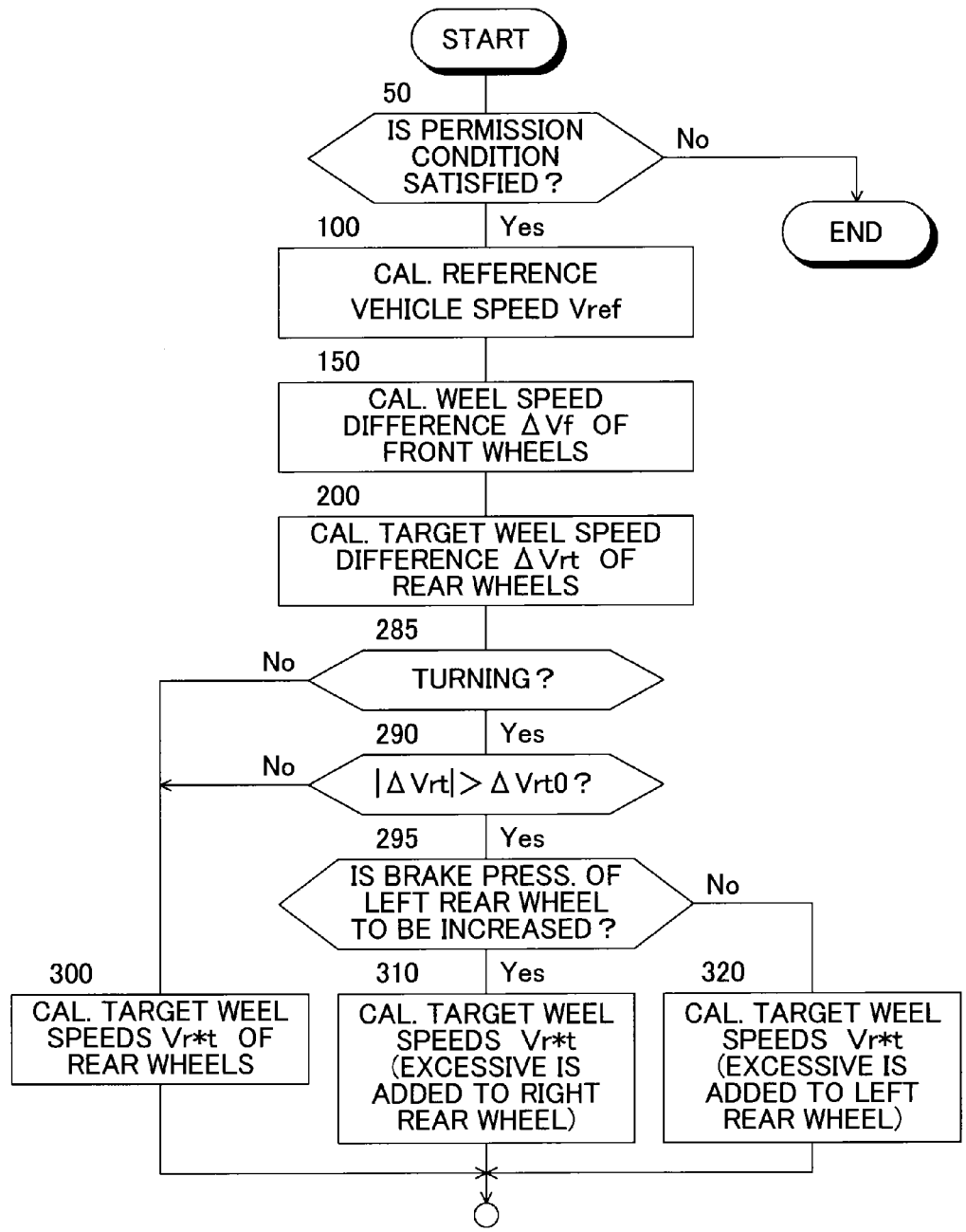
FIG. 8 is a flowchart showing a routine of the braking force distribution control in the sixth embodiment of the braking force distribution control device for a vehicle according to the present invention.

FIG. 8 is a flowchart showing a routine of the braking force distribution control in the sixth embodiment of the braking force distribution control device for a vehicle according to the present invention.

In the sixth embodiment, after completion of step 200, step 285 is conducted, and steps 290, 295, 310 and 320 are conducted according to the circumstances. The steps other than these steps are conducted in the similar manner as in the above-described first embodiment.

In step 285, a decision is made as to whether or not the vehicle is turning on the basis of, for example, a yaw rate γ of the vehicle and/or a lateral acceleration Gy of the vehicle. If a negative decision is made, the control proceeds to step 300, whereas if an affirmative decision is made, the control proceeds to step 290.

In step 290, a decision is made as to whether or not the target wheel speed difference ΔVrt of the left and right rear wheels is larger in magnitude than a reference value ΔVrt0 (a positive constant). If a negative decision is made, the control proceeds to step 300, whereas if an affirmative decision is made, the control proceeds to step 295. It is to be noted that the reference value ΔVrt0 may be variably set in accordance with a wheel load ratio Rpx so that when a wheel load ratio Rpx is small, the reference value ΔVrt0 becomes smaller as compared to the case where a wheel load ratio Rpx is large.

In step 295, a decision is made as to whether or not the brake pressure of the left rear wheel is to be increased when the brake pressures are controlled based on the target wheel speed difference ΔVrt of the left and right rear wheels. If a negative decision is made, i.e. if a decision is made that the brake pressure of the right rear wheel is to be increased, the control proceeds to step 320, whereas if an affirmative decision is made, the control proceeds to step 310. It is to be noted that in the case where ΔVrt is a positive value, a decision is made that the brake pressure of the right rear wheel is to be increased, but in the case where ΔVrt is a negative value, a decision is made that the brake pressure of the left rear wheel is to be increased.

In step 310, an excessive amount ΔΔVrt of the target wheel speed difference ΔVrt is calculated according to the following formula 8. Target wheel speeds Vrlt and Vrrt of the left and right rear wheels are calculated on the basis of the reference vehicle speed Vref, the target wheel speed difference ΔVrt of the left and right rear wheels and the excessive amount ΔΔVrt according to the formulas 9 and 10, respectively.

$$\Delta\Delta Vrt = |\Delta Vrt| - \Delta Vrt0 \quad (8)$$

$$Vrlt = Vref - \Delta Vrt0/2 \quad (9)$$

$$Vrrt = Vref + \Delta Vrt0/2 + \Delta\Delta Vrt \quad (10)$$

In step 320, an excessive amount ΔΔVrt of the target wheel speed difference ΔVrt is calculated according to the above-mentioned formula 8. Target wheel speeds Vrlt and Vrrt of the left and right rear wheels are calculated on the basis of the reference vehicle speed Vref, the target wheel speed difference ΔVrt of the left and right rear wheels and the excessive amount ΔΔVrt according to the formulas 11 and 12, respectively.

$$Vrlt = Vref - \Delta Vrt0/2 - \Delta\Delta Vrt \quad (11)$$

$$Vrrt = Vref + \Delta Vrt0/2 \quad (12)$$

In the above-described embodiments other than this embodiment, as the wheel speed difference ΔVf of the left and right front wheels increases in magnitude, the target wheel speed difference ΔVrt of the left and right rear wheels increases in magnitude, and as the target wheel speed of a rear wheel decreases, the target braking force of the rear wheel increases. Accordingly, as the target wheel speed difference ΔVrt of the left and right rear wheels increases in magnitude, the target braking force on the side where a target wheel speed is lower becomes large. For this reason, the control of the wheel speed of that wheel is liable to be unstable and an anti-skid control is liable to start earlier for that wheel.

In contrast, according to the sixth embodiment, when the target wheel speed difference ΔVrt of the left and right rear wheels exceeds the reference value ΔVrt0 in magnitude, the control amount of the excessive amount ΔΔVrt is added as an increasing correction amount to the target wheel speed on the side where brake pressure is to be decreased. Therefore, even if the target wheel speed difference ΔVrt of the left and right rear wheels exceeds the reference value ΔVrt0 in magnitude, the target braking force on the side where the target wheel speed is lower can be prevented from increasing excessively by the amount corresponding to the excessive amount ΔΔVrt.

Thus, according to the sixth embodiment, not only turning deviation of the vehicle can effectively be suppressed as in the first embodiment, but also the target braking force on the side where the target wheel speed is lower between the left and right rear wheels can be prevented from excessively increasing. Therefore, in the situation where the target wheel speed difference of the left and right rear wheels is large, it is possible to prevent such an undesirable event as that wheel sped control becomes unstable or an anti skid control starts earlier from occurring due to the excessive increase of a target braking force.

In the present embodiment, step 290 and the following steps are conducted when a decision is made that the vehicle is turning in step 285. However, step 285 may be omitted and step 290 and the following steps may be conducted regardless whether or not the vehicle is turning.

A modification may be made so that, regardless whether or not an excessive amount ΔΔVrt is present, when the target wheel speed difference ΔVrt is large in magnitude, the proportion is increased at which the target wheel speed difference ΔVrt is added as an increasing correction amount to the target wheel speed on the side where brake pressure is to be decreased. In that case, however, even in the situation where the target wheel speed difference ΔVrt of the left and right rear wheels is not larger than the reference value ΔVrt0 in magnitude, the relationship between the target wheel speeds of the left and right rear wheels differs from their proper relationship.

By contrast, according to the sixth embodiment, when the target wheel speed difference ΔVrt of the left and right rear wheels exceeds the reference value ΔVrt0 in magnitude, the target wheel speed difference ΔVrt is added as an increasing correction amount to the target wheel speed on the side where brake pressure is to be decreased. Therefore, in the situation where the target wheel speed difference ΔVrt of the left and right rear wheels is not larger than the reference value ΔVrt0 in magnitude, the relationship between the target wheel speeds of the left and right rear wheels can be prevented from differing from their proper relationship.

Seventh Embodiment

Figure 9:
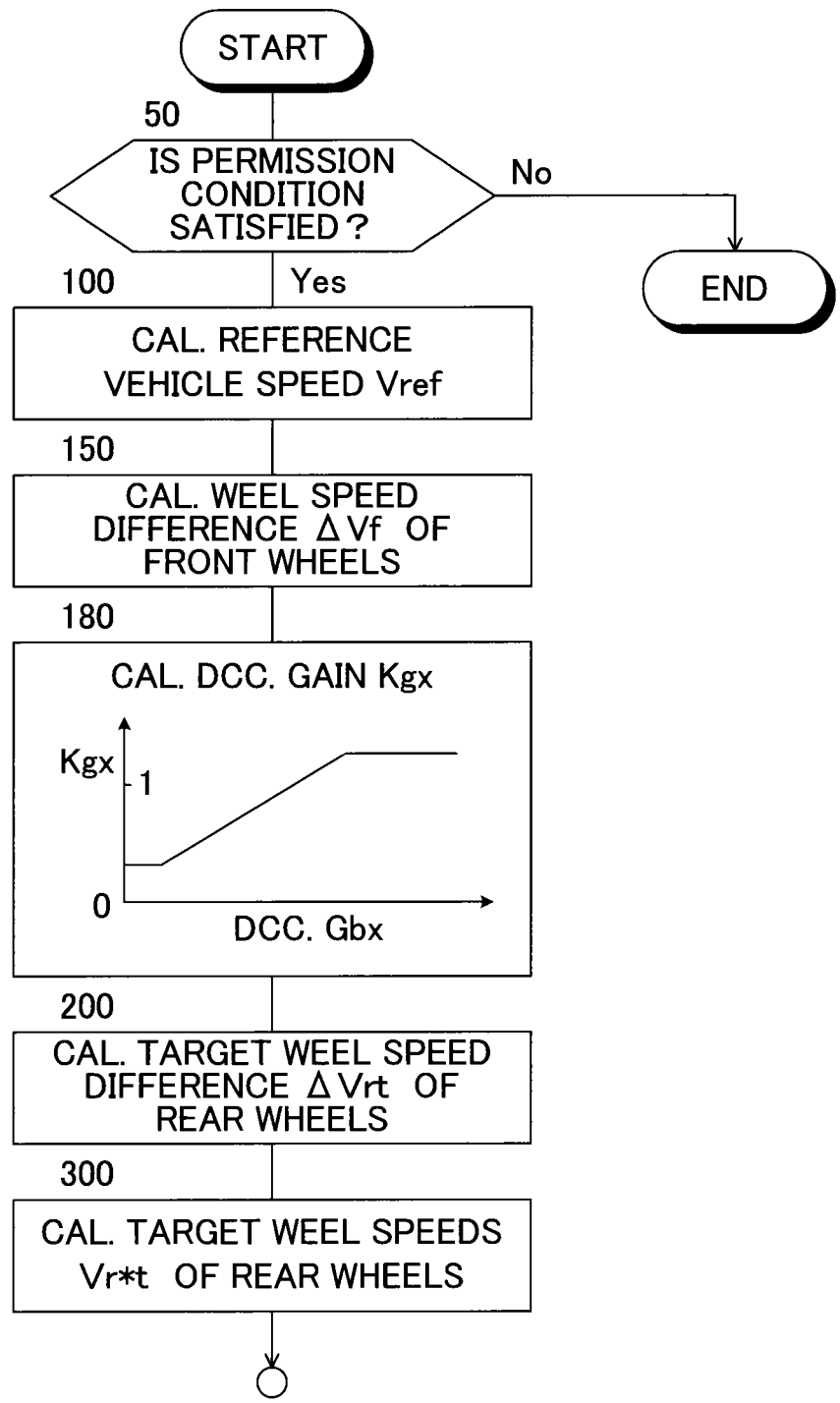
FIG. 9 is a flowchart showing a routine of the braking force distribution control in the seventh embodiment of the braking force distribution control device for a vehicle according to the present invention.

FIG. 9 is a flowchart showing a routine of the braking force distribution control in the seventh embodiment of the braking force distribution control device for a vehicle according to the present invention.

In the seventh embodiment, after completion of step 150, step 180 is conducted, and the steps other than steps 180 and 200 are conducted in the similar manner as in the above-described first embodiment.

In step 180, a vehicle deceleration Gbx is calculated on the basis of, for example, the vehicle longitudinal acceleration Gx. In addition, a deceleration gain Kgx is calculated on the basis of the vehicle deceleration Gbx so that when a vehicle deceleration Gbx is high, a deceleration gain Kgx becomes larger as compare to the case where a vehicle deceleration Gbx is low, and subsequently, the control proceeds to step 200.

In step 200, a target wheel speed difference ΔVrt of the left and right rear wheels is calculated on the basis of the wheel speed difference ΔVf and the deceleration gain Kgx according to the following formula 13 in place of the above-mentioned formula 1.

$$\Delta Vrt = -Kgx\, Rpx0\, \Delta Vf \quad (13)$$

In general, when a vehicle deceleration is low, the degree of turning deviation of a vehicle due to braking force difference between left and right wheels is lower as compared to the case where a vehicle deceleration is high, and accordingly, a vehicle is liable to be affected by the influence of an error in the wheel speed difference ΔVf of the left and right front wheels due to a disturbance from a road surface and the like. When a vehicle deceleration is high, the degree of turning deviation of a vehicle due to braking force difference between left and right wheels is higher as compared to the case where a vehicle deceleration is low, and accordingly, the turning deviation of a vehicle is preferable to be effectively suppressed.

According to the seventh embodiment, a deceleration gain Kgx is calculated so that when a vehicle deceleration Gbx is high, the deceleration gain Kgx becomes larger as compare to the case where a vehicle deceleration Gbx is low, and a target wheel speed difference ΔVrt of the left and right rear wheels is calculated according to the above-mentioned formula 13.

Thus, according to the seventh embodiment, not only turning deviation of the vehicle can effectively be suppressed as in the first embodiment, but also a ratio of the target wheel speed difference ΔVrt relative to the wheel speed difference ΔVf can be varied in accordance with a vehicle deceleration. Therefore, in the situation where a vehicle deceleration is high, turning deviation of a vehicle can effectively be suppressed, and in the situation where a vehicle deceleration is low, a vehicle can be prevented from being affected by the influence of an error in the wheel speed difference ΔVf of the left and right front wheels due to a disturbance from a road surface and the like.

While in the present embodiment, the deceleration gain Kgx is set to a value larger than 1 when a vehicle deceleration Gbx is high, the deceleration gain Kgx may be set to 1 when a vehicle deceleration Gbx is high.

Eighth Embodiment

FIG. 10 is a flowchart showing a routine of the braking force distribution control in the eighth embodiment of the braking force distribution control device for a vehicle according to the present invention.

In the eighth embodiment, after completion of step 50, step 60 is conducted. The steps other than step 60 are conducted in the similar manner as in the above-described first embodiment.

In step 60, a decision is made as to whether or not the road is a so called split-μ road where the friction coefficients of the road corresponding to the left and right wheels are different from each other. If a negative decision is made, the control proceeds to step 100, whereas if an affirmative decision is made, the control proceeds to step 700. It is to be noted that the decision as to whether or not the road is a so called split-μ road may be conducted in any manner known in the present technical field.

In general, when braking is effected in the situation where a vehicle runs on a split-μ road, the wheel speed on the side of lower friction coefficient becomes lower than that on the side of higher friction coefficient. For this reason, if either of the controls of the above-described embodiments is executed, the target wheel speeds of the left and right rear wheels become such values that the target wheel speed on the side of higher friction coefficient is lower than that on the side of lower friction coefficient, and the brake pressure on the side of higher friction coefficient becomes higher than that on the side of lower friction coefficient. As a result, in both of the front and rear wheels, the braking force on the side of higher friction coefficient becomes higher than that on the side of lower friction coefficient, which may encourage turning deviation of the vehicle that a driver does not intend.

According to the eighth embodiment, if a decision is made that the road is a split-μ road, in step 700 the braking pressures of the left and right rear wheels are maintained and the braking force distribution control in step 100 and the following steps are not executed. Therefore, in the situation where the road is a split-μ road, even if the wheel speed difference ΔVf of the left and right front wheels becomes large, the braking forces of the left and right rear wheels can be prevented from being controlled by the braking force distribution control.

Thus, according to the eighth embodiment, not only turning deviation of the vehicle can effectively be suppressed as in the first embodiment, but also turning deviation of the vehicle can effectively be prevented from being encouraged in the situation where braking is conducted when the vehicle is running on a split-μ road.

While the present invention has been described with reference to the above embodiments, it will be apparent to those skilled in the art that the present invention is not limited thereto, but may be embodied in various other forms without departing from the scope of the invention.

For example, while in the above-described embodiments, a braking slip index value is a wheel speed, the index value may be a braking slip amount or a braking slip rate. It should be noted, however, that the magnitude relationship of braking slip amounts or braking slip rates is converse to that of wheel speeds.

While in the above-described embodiments, the reference values ΔV1-ΔV3 are constant, at least one of them may be variably set. For example, the reference values may be variably set so that when a wheel load ratio Rpx of front wheels relative to the rear wheels is small, at least one of them becomes smaller as compared to the case where the ratio is large.

While in the above-described embodiments, a vehicle longitudinal acceleration Gx and a lateral acceleration Gy for calculating the wheel load ratio Rpx and Rpy are values detected by sensors, these accelerations may be estimated values. For example, a vehicle longitudinal acceleration Gx may be estimated on the basis of wheel speeds Vi. A vehicle lateral acceleration Gy may be estimated to be a product of a vehicle speed that is estimated on the basis of wheel speeds Vi and a vehicle yaw rate γ.

In the above-described embodiments other than the second embodiment, the ratio of a target wheel speed difference ΔVrt of the left and right rear wheels relative to a wheel speed difference ΔVf of the left and right front wheel speeds in magnitude is the wheel load ratio Rpx0 of front wheels relative to the rear wheels in the situation where the vehicle is under a standard braking condition. However, the ratio |ΔVrt|/|ΔVf| of wheel speed differences in magnitude may be set to a wheel load ratio of front wheels relative to the rear wheels in the situation where the vehicle is stationary or to 1.

The above-described second through eighth embodiments may be implemented in any combination thereof, and in those cases the effects achieved by the respective embodiments can be obtained in combination.

In the above-described embodiments, the front wheels are control reference wheels having the higher braking force sharing rate and the rear wheels are control object wheels having the lower braking force sharing rate. However, the braking force distribution control device for a vehicle according to the present invention may be applied to a vehicle such as a truck in which rear wheels are control reference wheels having the higher braking force sharing rate and front wheels are control object wheels having the lower braking force sharing rate.

In the above-described embodiments, during normal operation, the braking force of each wheel is controlled in accordance with the depression force on the brake pedal 26, i.e. braking demand by a driver by means of each control valve and each on-off valve being set to a non-control position. However, the braking force distribution control device for a vehicle according to the present invention may be applied to a vehicle in which the braking force of each wheel is controlled in accordance with braking demand by a driver by means of each control valve and each on-off valve being controlled with the communication control valves 42A and 42B being opened.

The invention claimed is:

1. A braking force distribution control device for a vehicle having a braking apparatus capable of individually controlling braking forces of wheels, wherein with front or rear wheels having higher braking force sharing rate being referred to control reference wheels and the front or rear wheels having lower braking force sharing rate being referred to control object wheels; and a difference value between braking slip index values of the left and right wheels of said control reference wheels being referred to a reference difference value, a braking force distribution control is executed on said control object wheels so that the magnitude relationship in braking slip index values of the left and right wheels of said control object wheels is converse to that of the left and right wheels of said control reference wheels.

2. A braking force distribution control device for a vehicle according to claim 1, wherein a target difference value between braking slip index values of the left and right wheels of said control object wheels is calculated on the basis of said reference difference value, and the braking force distribution control is executed on said control object wheels so that a difference value between braking slip index values of the left and right wheels of said control object wheels is made closer to said target difference value.

3. A braking force distribution control device for a vehicle according to claim 2, wherein a ratio of said target difference value relative to said reference difference value in magnitude is preset to a constant value on the basis of a standard value of longitudinal wheel load ratio of said control object wheels relative to said control reference wheels which is determined by a specification of the vehicle and a standard value of longitudinal wheel load shift preset for the situation where the vehicle is under braking.

4. A braking force distribution control device for a vehicle according to claim 2, wherein a longitudinal wheel load ratio of said control object wheels relative to said control reference wheels is estimated, and a ratio of said target difference value relative to said reference difference value in magnitude is variably set on the basis of the estimated longitudinal wheel load ratio.

5. A braking force distribution control device for a vehicle according to claim 1, wherein a lateral wheel load ratio of one of said control object wheels relative to the other of said control object wheels is estimated, and the distribution control amounts of the braking forces of said control object wheels are corrected on the basis of the estimated lateral wheel load ratio.

6. A braking force distribution control device for a vehicle according to claim 1, wherein when a detected direction of yaw movement of the vehicle and a direction of yaw movement of the vehicle estimated on the basis of a difference value between braking slip index values of the left and right front wheels of said control reference wheels are not the same, said braking force distribution control is prohibited from being executed on said control object wheels.

7. A braking force distribution control device for a vehicle according to claim 1, wherein when change rate in the wheel braking slip index of at least one of said control reference wheels exceeds in magnitude a change rate reference value, braking force distribution control amounts of said control object wheels are reduced in magnitude.

8. A braking force distribution control device for a vehicle according to claim 2, wherein when said target difference value is large in magnitude, the ratio of the distribution control amount on the braking force decreasing side relative to that on the braking force increasing side is increased as compared to the case where said target difference value is small in magnitude.

9. A braking force distribution control device for a vehicle according to claim 2, wherein when said target difference value exceeds an excessive reference value in magnitude, braking force distribution control amounts of the left and right wheels of said control object wheels are calculated on the basis of a value which corresponds to said excessive reference value and is included in said target difference value, and a braking force distribution control amount of the wheel which belongs to said control object wheels and is on the braking force decreasing side is increased in magnitude on the basis of the excessive amount by which said target difference value exceeds said excessive reference value in magnitude.

10. A braking force distribution control device for a vehicle according to claim 2, wherein when a vehicle deceleration is high, a ratio of said target difference value relative to said reference difference value is increased in magnitude as compared to the case where a vehicle deceleration is low.

11. A braking force distribution control device for a vehicle according to claim 1, wherein when friction coefficients of a road corresponding to the left and right wheels of said control reference wheels are different from each other, braking force distribution control amounts of said control object wheels are decreased in magnitude.

12. A braking force distribution control device for a vehicle according to claim 2, wherein a reference vehicle speed is calculated on the basis of the wheel speeds of said control reference wheels; target wheel speeds of the left and right wheels of said control object wheels are calculated on the basis of said reference vehicle speed and said target difference value; and braking forces of the left and right wheels of said control object wheels are controlled so that the wheel speeds of the left and right wheels of said control object wheels are made closer to said associated target wheel speeds.

13. A braking force distribution control device for a vehicle according to claim 1, wherein said control reference wheels are front wheels and said control object wheels are rear wheels.

* * * * *

UNITED STATES PATENT AND TRADEMARK OFFICE
CERTIFICATE OF CORRECTION

| | | |
|---|---|---|
| PATENT NO. | : 8,838,357 B2 | Page 1 of 1 |
| APPLICATION NO. | : 13/817258 | |
| DATED | : September 16, 2014 | |
| INVENTOR(S) | : Yoshinori Watanabe | |

It is certified that error appears in the above-identified patent and that said Letters Patent is hereby corrected as shown below:

On the title page, Item (73), the Assignee's Information is incorrect. Item (73) should read:

--(73) Assignee: Toyota Jidosha Kabushiki Kaisha,
　　　　　　　　Toyota-shi (JP)--

Signed and Sealed this
Thirteenth Day of January, 2015

Michelle K. Lee
*Deputy Director of the United States Patent and Trademark Office*